United States Patent
Yamamoto et al.

(10) Patent No.: US 6,915,359 B2
(45) Date of Patent: Jul. 5, 2005

(54) DATA TRANSFER DEVICE, DATA TRANSFER METHOD, DATA TRANSFER PROGRAM AND COMPUTER READABLE STORAGE MEDIUM THEREOF

(75) Inventors: Youichi Yamamoto, Hiroshima-Ken (JP); Yoshihiro Tabira, Osaka-Fu (JP); Isamu Ishimura, Kyoto-Fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 441 days.

(21) Appl. No.: 09/989,302

(22) Filed: Nov. 21, 2001

(65) Prior Publication Data

US 2002/0073251 A1 Jun. 13, 2002

(30) Foreign Application Priority Data

Nov. 22, 2000 (JP) ........................................ 2000-355404

(51) Int. Cl.7 ............................. G06F 13/00; G06F 3/00
(52) U.S. Cl. .................................. 710/33; 710/4; 710/5; 710/20; 710/22; 710/40; 710/52
(58) Field of Search ............................ 710/4, 5, 20, 33, 710/40, 52, 22

(56) References Cited

U.S. PATENT DOCUMENTS 5,687,392 A * 11/1997 Radko ......................... 710/22
6,633,926 B1 * 10/2003 Harada et al. ................ 710/22

FOREIGN PATENT DOCUMENTS

JP 3-294280 11/1991

* cited by examiner

Primary Examiner—Tammara Peyton
(74) Attorney, Agent, or Firm—McDermott Will & Emery LLP

(57) ABSTRACT

A data transfer device which set an address of page as transfer destination and transfer data to the page. In the data transfer device to which the present invention is applied, an address and page length of a page are acquired on the basis of an address of a page table specified by a read command. Then, transfer information including the address of transfer source, transfer data length and address of transfer destination of data is set according to page element of page as transfer destination page. Then, it is judged whether the transfer destination page and other page form a continuous area. And if it is judged that the continuous area is formed, transfer information will be changed. Data transfer is effected on the basis of changed transfer information. That reduces the need to set the other area at the transfer destination and thus the transfer efficiency improves.

9 Claims, 31 Drawing Sheets

FIG. 13

| start_page | end_page | page_counter |  |  |  |  |  |
|---|---|---|---|---|---|---|---|
| | transfer_length | | | | | | |
| | buffer_point | | | | | | |
| 1st segment_length | | | 1st segment_base_hi | | | | |
| | | 1st segment_base_lo | | | | | |
| 2nd segment_length | | | | 2nd segment_base_hi | | | |
| | | | 2nd segment_base_lo | | | | |
| | | | | ⋯ | | | |
| | | | | | ⋯ | | |
| nth segment_length | | | | | | nth segment_base_hi | |
| | | | | | | nth segment_base_lo | |

| Host | 1st | 2nd | 3rd | Last1 | Last |
|---|---|---|---|---|---|
| CD9050 |  | 1 | 1 | 1 | 1 |
|  |  |  |  |  |  |
|  |  |  |  |  |  |
| 186D000 | 14 | 15 | 15 | 15 | 15 |
| 186D000 | 13 | 14 | 14 | 14 | 14 |
| 186D000 | 15 | 16 | 16 | 16 | 16 |
| 1870000 | 12 | 13 | 13 | 13 | 13 |
| 1871000 |  |  |  |  |  |
| 1872000 |  |  |  |  |  |
| 1873000 | 11 | 12 | 12 | 12 | 12 |
| 1874000 |  |  |  |  |  |
| 1875000 | 10 | 11 | 11 | 11 | 11 |
| 1876000 | 9 | 10 | 10 | 10 | 10 |
| 1877000 |  |  |  |  |  |
| 1878000 |  |  |  |  |  |
| 1879000 |  |  |  |  |  |
| 187A000 |  |  |  |  |  |
| 187B000 | 6 | 7 | 7 | 7 | 7 |
| 187C000 |  |  |  |  |  |
| 187D000 |  |  |  |  |  |
| 187E000 | 5 | 6 | 6 | 6 | 6 |
| 187F000 | 7 | 8 | 8 | 8 | 8 |
| 1880000 | 4 | 5 | 5 | 5 | 5 |
| 1881000 | 8 | 9 | 9 | 9 | 9 |
| 1882000 | 3 | 4 | 4 | 4 | 4 |
| 1883000 |  |  |  |  |  |
| 1884000 | 2 | 3 | 3 | 3 | 3 |
| 1885000 |  |  |  |  |  |
| 1886000 |  | 2 | 2 | 2 | 2 |
| 1886500 | 1 |  |  |  |  |
|  |  |  |  |  |  |
|  |  |  |  |  |  |
| 1893000 | 16 |  |  |  |  |

DATA TRANSFER DEVICE, DATA TRANSFER METHOD, DATA TRANSFER PROGRAM AND COMPUTER READABLE STORAGE MEDIUM THEREOF

BACKGROUND OF THE INVENTION

1. Field of the Invention

The present invention relates to a data transfer device to transfer data, data transfer method, data transfer program and recording mediums in which the data transfer program is recorded and which can be read by computer.

2. Description of the Related Art

The personal computer (PC) is provided with a variety of interfaces for data communication with peripheral equipment. As shown in FIG. 1, for example, parallel interfaces such as small computer system interface (SCSI) and AT attachment packet interface (ATAPI) are mainly used where PC 101 is connected with a hard disk drive (HDD), and a digital versatile disk read only memory (DVD-ROM) 103 etc.

But in this field, too, serial interfaces such as universal serial bus (USB) interface and the Institute of Electrical and Electronics Engineers (IEEE) 1394 interface have come to be utilized in recent years.

USB interface and IEEE 1394 interface are flexible with regard to the form of connection among devices. Another feature is that each device is connected by the plug-and-play method and there is no need to set ID for each terminal. For this reason, the USB interface, IEEE 1394 interface etc. may be called interfaces highly convenient for end users.

Furthermore, USB interface and IEEE 1394 interface are serial interfaces and it is relatively easy to speed up the data transfer frequency. Because of this, the USB interface and IEEE 1394 interface have achieved relatively high transfer speed.

In the IEEE 1394 interface, serial bus protocol 2 (SBP-2), for example, is used as protocol for data transfer. In SBP-2, an initiator issues a request to a target. The target processes this request and returns a status and data to the initiator. In a combination of PC and peripheral equipment, PC is generally an initiator and the peripheral equipment is a target.

As described in Section 5.2 of the standards of SBP-2, the request is expressed by operation request block (ORB). ORB is prepared in a system memory of the initiator and the target fetches ORB from the initiator. There are a number of kinds of formats of ORB. Command block ORB is used to transfer a command to control the target. A format of command block ORB is shown in FIG. 2.

As shown in FIG. 2, command block ORB includes a field called a command block. In this command block, a command descriptor block (CDB) in SCSI standards, for example, is encapsulated. CDB is used for transfer of a read command or write command etc. A CDB format for 12-byte command is shown in FIG. 3. In the figure, the graduation in the horizontal direction expressed in bits and that in the vertical direction is in bytes.

As shown in FIG. 3, CDB includes a field called an operation code. In this field, a command code is written. In the case of read 10 command, 28 h is written in this field.

CDB includes a field called logical block address, too. In this field, a logic block address is written. In the case of the read command, the address written in this field indicates the read position.

In addition, CDB includes a field called a Transfer Length. In this field, the length of data to be transferred is written. The length of data is generally expressed in the number of blocks. In the case of the read command, what is written in this field is the length of data to be read.

In CDB, as mentioned above, the read position of data and the length of data to be read are written, but no transfer destination of data read out is written.

In other words, in the SCSI standards, when PC makes a read request to peripheral equipment, no transfer destination of data to be read by peripheral equipment is given to peripheral equipment.

In SBP-2, however, a transfer destination of data is written in a field called data_descriptor in the command block ORB. The target peripheral equipment acquires a data transfer destination by fetching a command block ORB from an initiator PC.

In the data_descriptor field of command block ORB, an address at which data is transferred or an address of a page table is written. An example of the address space of PC is shown in FIG. 4.

As shown in FIG. 4, command block ORB, page table and pages are located in this address space. In FIG. 4, in command block ORB, only some fields are shown.

In the page table as shown in FIG. 4, the address of each page and the page length of each page are stored. The target determines whether the address written in data_descriptor is a page table address or not on the basis of page_table_present bit (indicated by p in FIG. 2) of the fetched command block ORB.

If the value of page_table_present bit is 1, what is written in the data_descriptor field is the address of the page table. In this case, the target acquires the values of the data_size field and the page_size field of the fetched command block ORB block.

In the data_size field, the number of pages is written. In this example, the data_size field is 4. Furthermore, in the data_size field, the page length is written. If the value written in this field is 0, it indicates that the page lengths are different from page to page as shown in FIG. 4, for example. If the value in the field is other than 0, it means that the page length is fixed at the written value.

The target acquires the address of each page and the page length of each page from the page table on the basis of the values of the data_descriptor field, the data_size field and the page_size field as shown in FIG. 5.

And the target prepares a data transfer packet for each page on the basis of the page address and the page length acquired of each page and starts to transfer packets one after another.

In SCSI, the target is not informed of data transfer destination, and therefore for a plurality of data to be transferred, a plurality of commands will have to be issued. In SBP-2, only one command may be issued.

That is, it has an advantage that the overhead is reduced when commands are issued from PC.

However, when data are transferred as mentioned above, it is necessary to set a transfer destination for each page, and that reduces the efficiency of data transfer.

SUMMARY OF THE INVENTION

The present invention has been made in view of such a problem with the related art as mentioned above, and it is an object of the present invention to raise the efficiency of data transfer by reducing the number of resettings of transfer destination.

To achieve this object, the present invention adopts the following means.

In the present invention, if an instruction requesting data transfer to specify as destination of requested data an address of an area table in which plural pieces of area information including an area address and area length are written is issued, an acquisition means acquires the area information from the instruction issuing source on the basis of the address of the area table.

A transfer information setting means sets transfer information including an address of transfer source, transfer data length and an address of transfer destination of data on the basis of area information of the area as transfer destination area.

A judging means judges whether the transfer destination area and other area form a continuous area where plural areas are consecutive.

A transfer information changing means changes transfer information according to the continuous area if judging means judges that the transfer destination area and other area form the continuous area.

And a data transfer control means controls the transfer of data on the basis of transfer information.

If the transfer destination and other area are consecutive, data to be transferred to the transfer destination area and data to be transferred to other area will be transferred by the lump on the basis of transfer information according to the continuous area. Therefore, data transfer efficiency will improve.

The transfer information changing means changes the transfer data length of the transfer information to a value obtained by adding the area length of the other area to the transfer data length of the transfer information, for example.

The acquisition means may acquire plural pieces of area information one by one or by the lump.

Furthermore, an arranging means may be provided with the data transfer device. The arranging means arranges the pieces of area information acquired by the acquisition means according to increasing order of area address. In this case, the judging means judges according to the order of arrangement by the arranging means whether the transfer destination area and other area form the continuous area.

A previous area information memorizing means and area information judging means may be provided with the data transfer device. The previous area information memorizing means memorizes the area information acquired on a previous instruction requesting the data transfer. The area information judging means judges whether the previous area information memorized in the previous area information memorizing means agrees with the area information acquired by the acquisition means on the latest instruction requesting data transfer. In this case, the data transfer control means controls the data transfer in the same way as for the previous transfer.

BRIEF DESCRIPTION OF THE DRAWINGS

FIG. 13 is a diagram showing a configuration of batch transfer information table in Embodiment 2.

FIG. 29 is a diagram showing the assignment state of pages in the address space of PC in connection with each instruction requesting data transfer issued a plurality of times.

DESCRIPTION OF THE PREFERRED EMBODIMENTS

Embodiment 1

In the present embodiment, the present invention appears in a hard disk drive (hereinafter referred to as HDD) that sends data to and receives data from the host PC, for example.

This HDD is connected with the host PC via serial interface conforming to IEEE 1394 standards. The receiving and sending of data between the host PC and the HDD is conducted on quadlet (4 bytes) read-write, block read-write provided for in IEEE 1394 standards etc. For control of data transfer, SBP-2 protocol is used.

Figure 1:
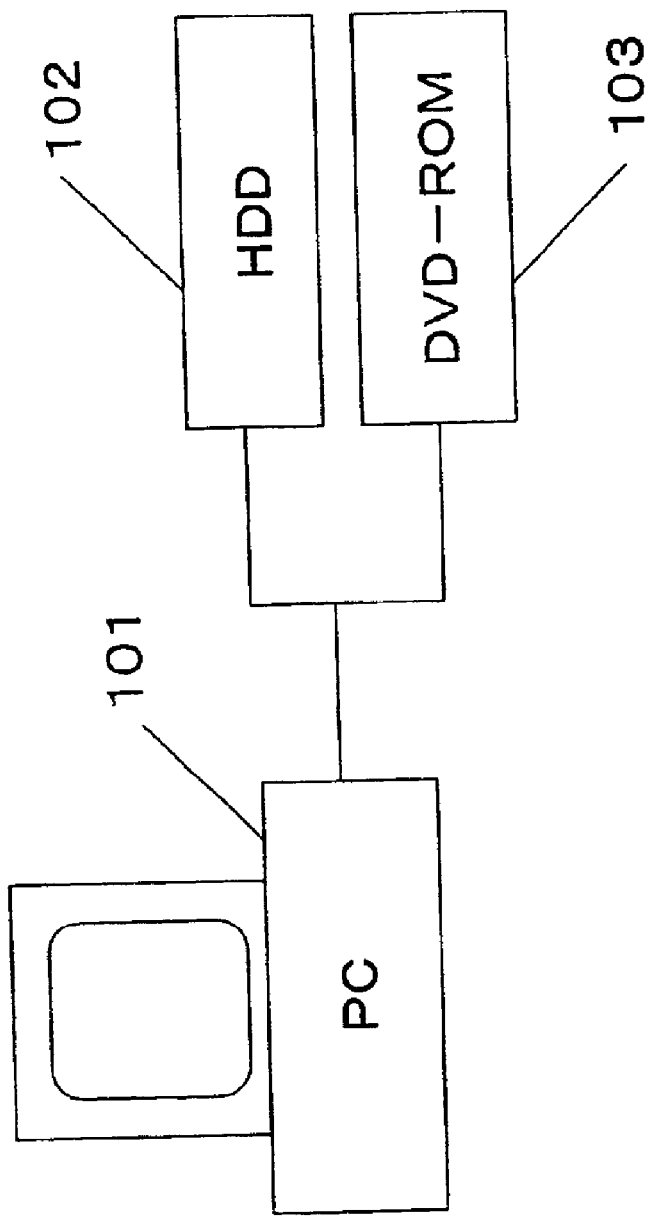
FIG. 1 is a diagram showing the connection between PC and peripheral equipment in a simple way.
Figure 2:
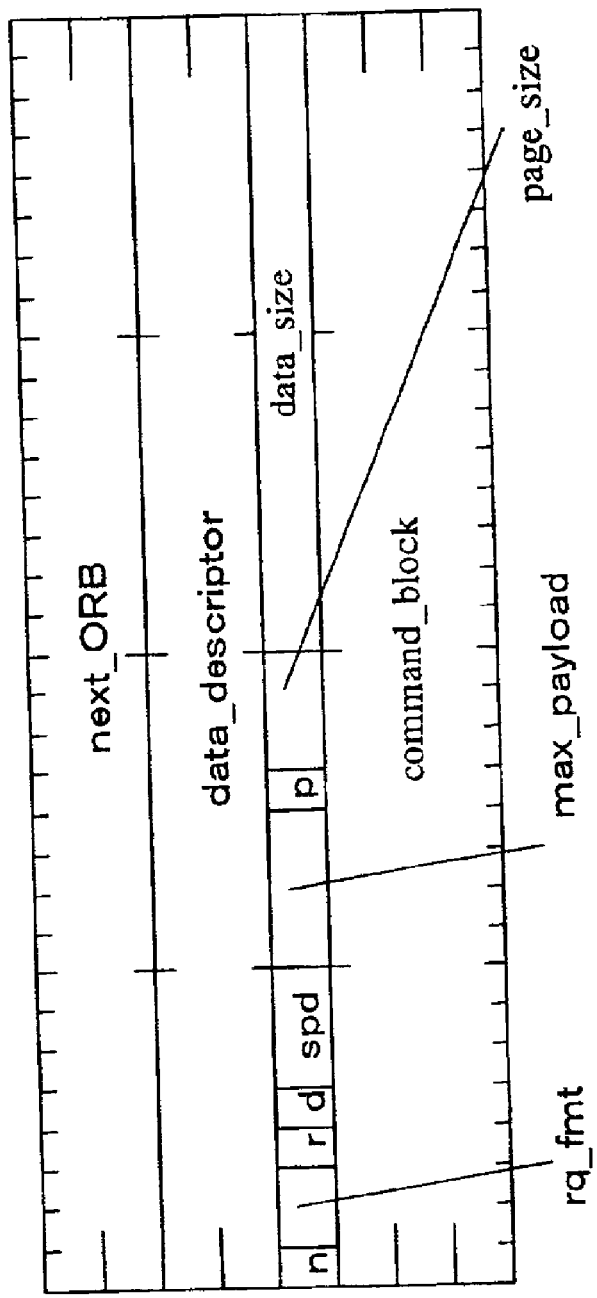
FIG. 2 is a diagram showing a format of command block ORB in SBP-2.
Figure 3:
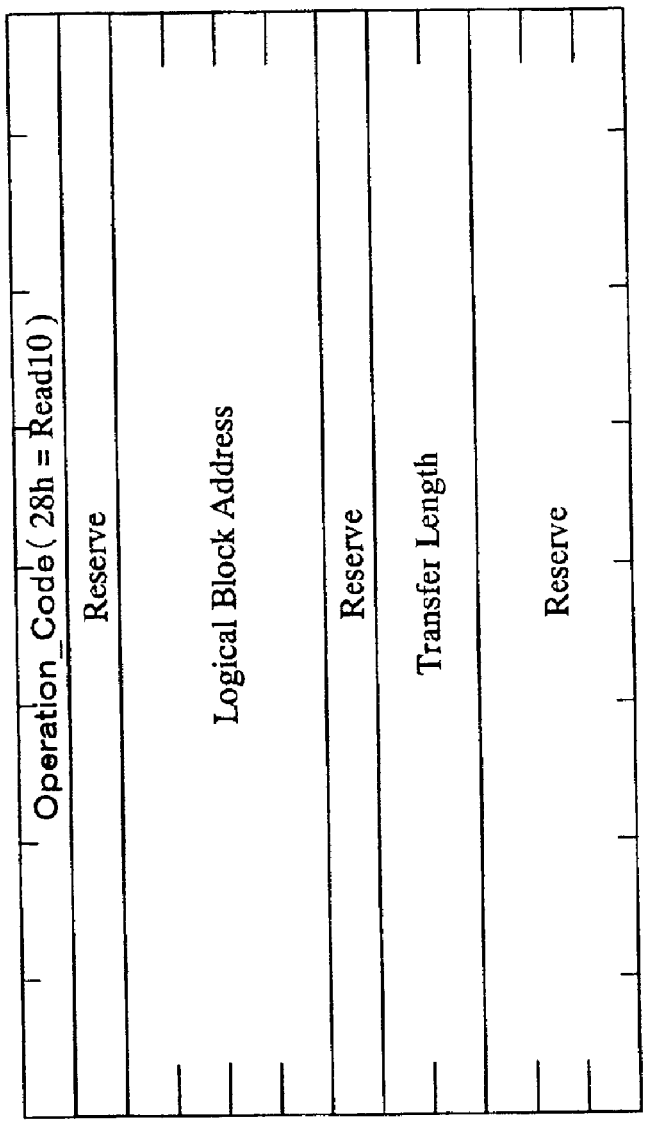
FIG. 3 is a diagram showing a format of CDB in SCSI.
Figure 4:
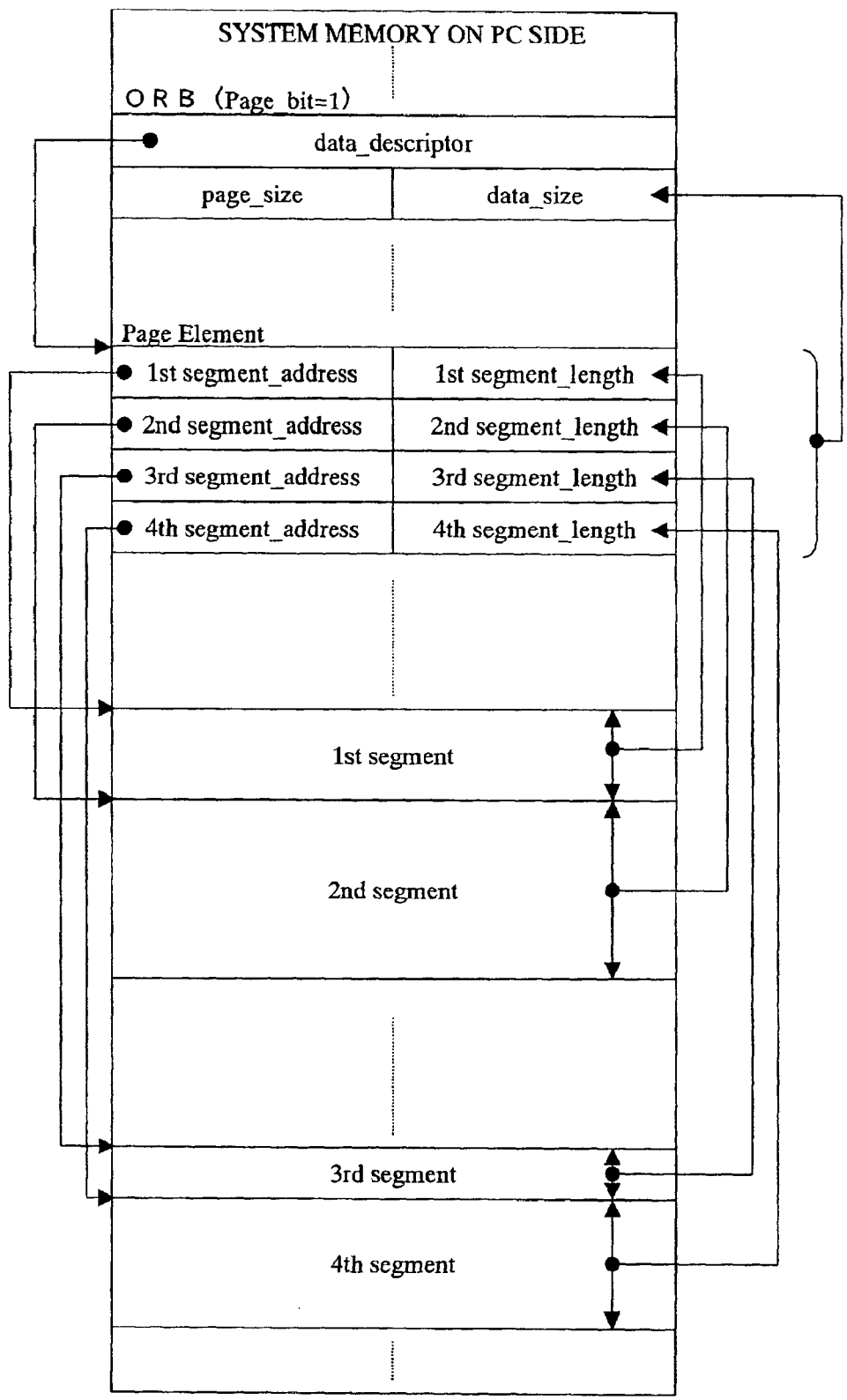
FIG. 4 is a diagram showing assignment of pages in the address space of PC.
Figure 5:
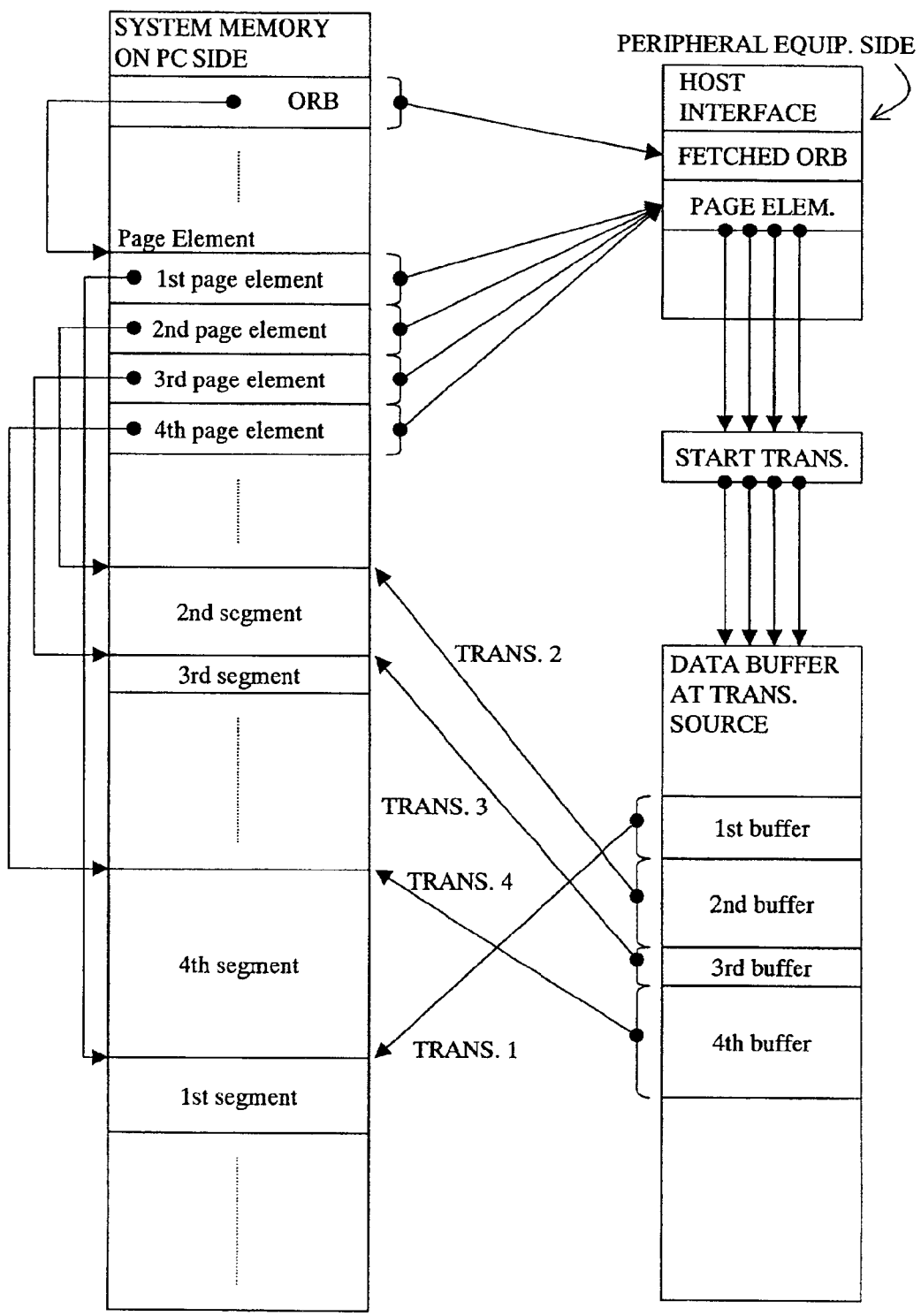
FIG. 5 is a diagram showing a relation in address space between the host PC and the HDD.
Figure 6:
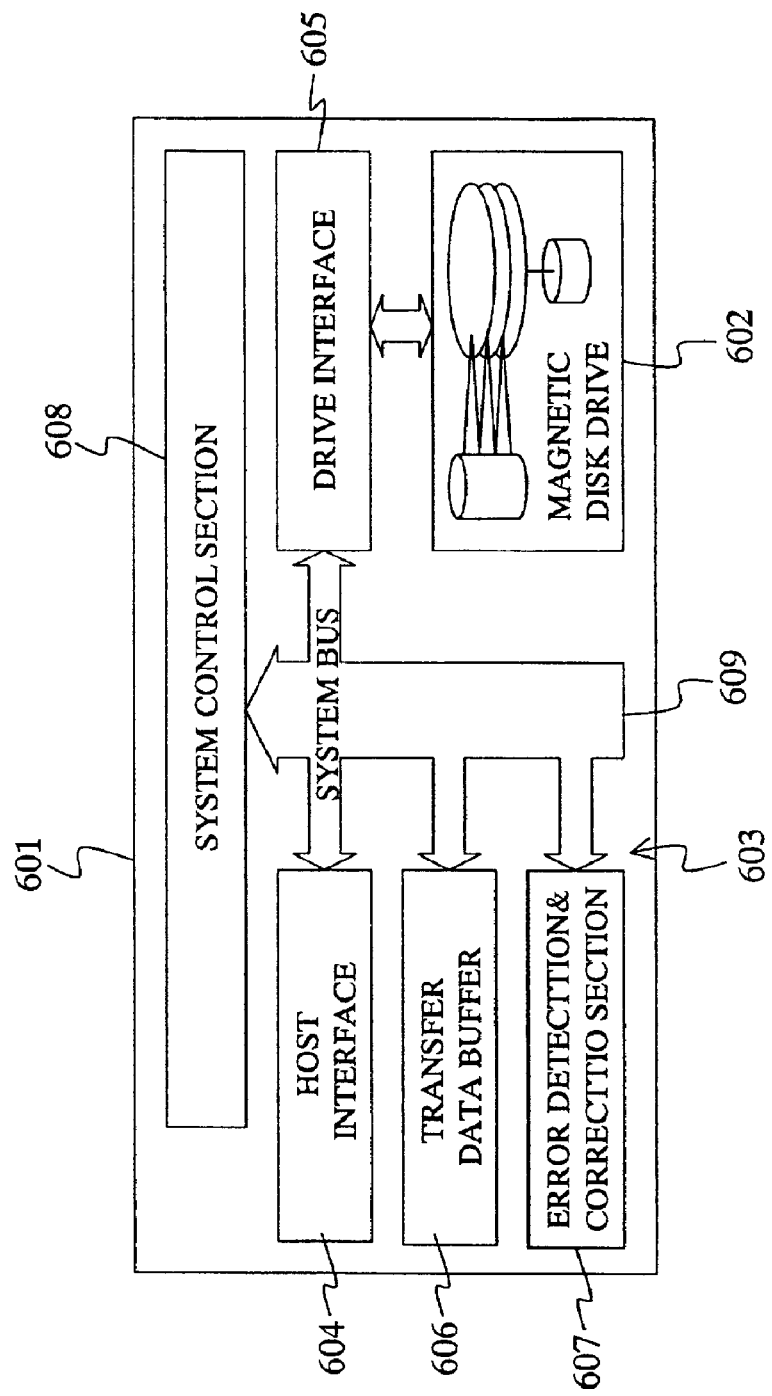
FIG. 6 is a schematic diagram showing a configuration of the HDD.

A typical example of the configuration of the HDD is shown in FIG. 6.

The HDD 601 is formed of a magnetic disk drive 602 and a magnetic disk controller 603 as shown in FIG. 6.

The magnetic disk drive 602 includes a plurality of magnetic disks to record data, a spindle motor to turn the magnetic disks, magnetic heads (one magnetic head is provided for each side of the magnetic disk), and an actuator to move the magnetic head to any track position.

The magnetic disk controller 603 comprises host interface 604, drive interface 605, transfer data buffer 606, error detection and correction section 607 and system control section 608. These are connected via system bus 609.

The host interface 604 is connected with the host PC and receives control commands issued by the host PC and also receives and sends status information and data. The command block ORB is also acquired from the host PC via host interface 604.

The drive interface 605 is connected with magnetic disk drive 602 and receives and sends drive control commands and transfer data.

The transfer data buffer 606 is an RAM to temporarily evacuate transfer data and absorbs the difference between the read/write velocity of magnetic disk drive 602 and data transfer velocity from the host PC.

The error detection and correction section 607 detects and corrects errors using an error correction code recorded along with data and also detects whether a sector to be accessed is a defective sector beyond the error correction capacity.

The system control section 608 includes a microprocessor, ROM and RAM and controls the whole of the magnetic disk controller 603 via system bus 609 according to a built-in control program in ROM.

The control program includes a data transfer program to control data transfer. For example, this data transfer program cooperates with the hardware of HDD 601, whereby a data transfer device is materialized.

Figure 7:
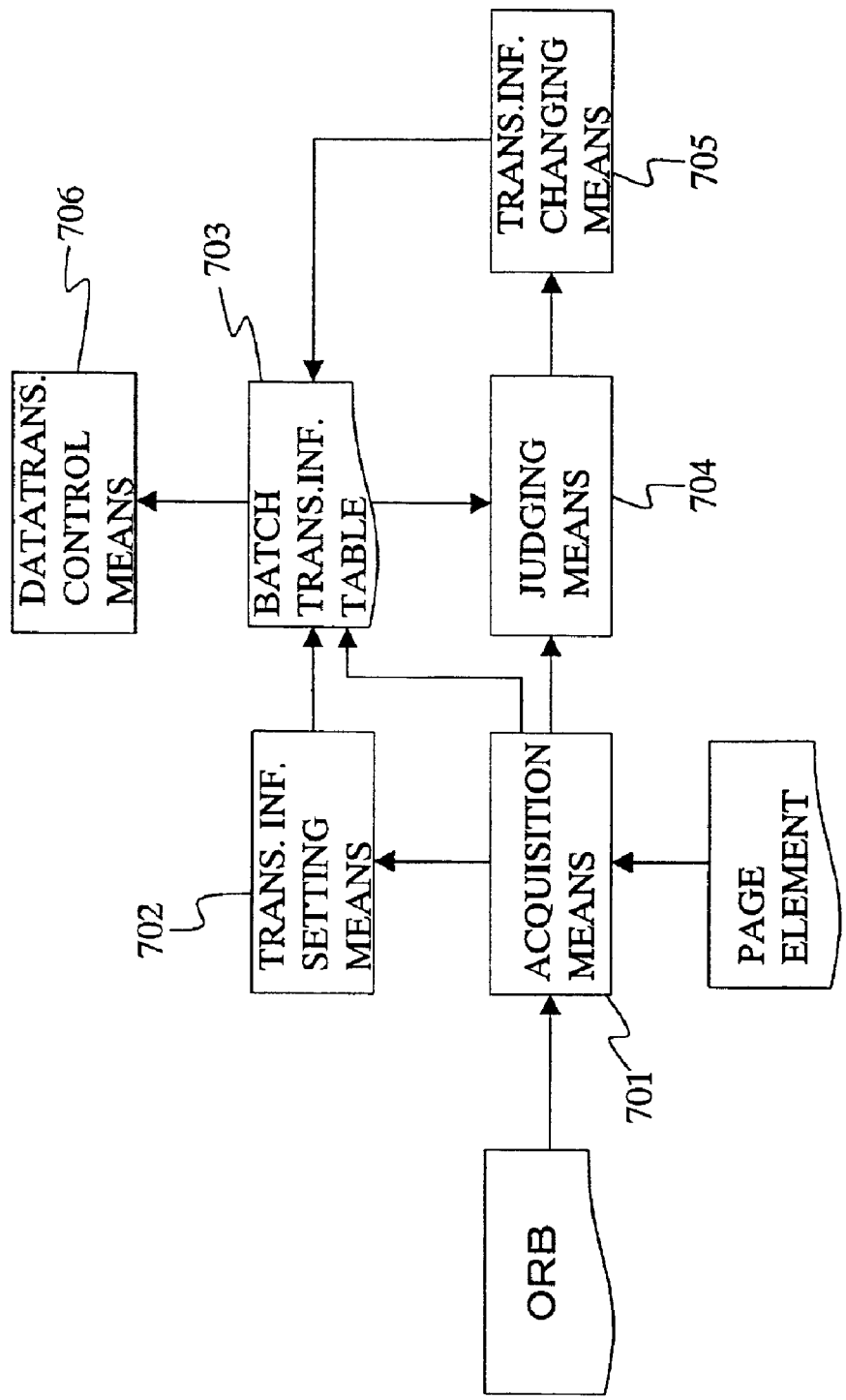
FIG. 7 is a functional block diagram showing an outline configuration of a data transfer device in Embodiment 1.
Figure 8:
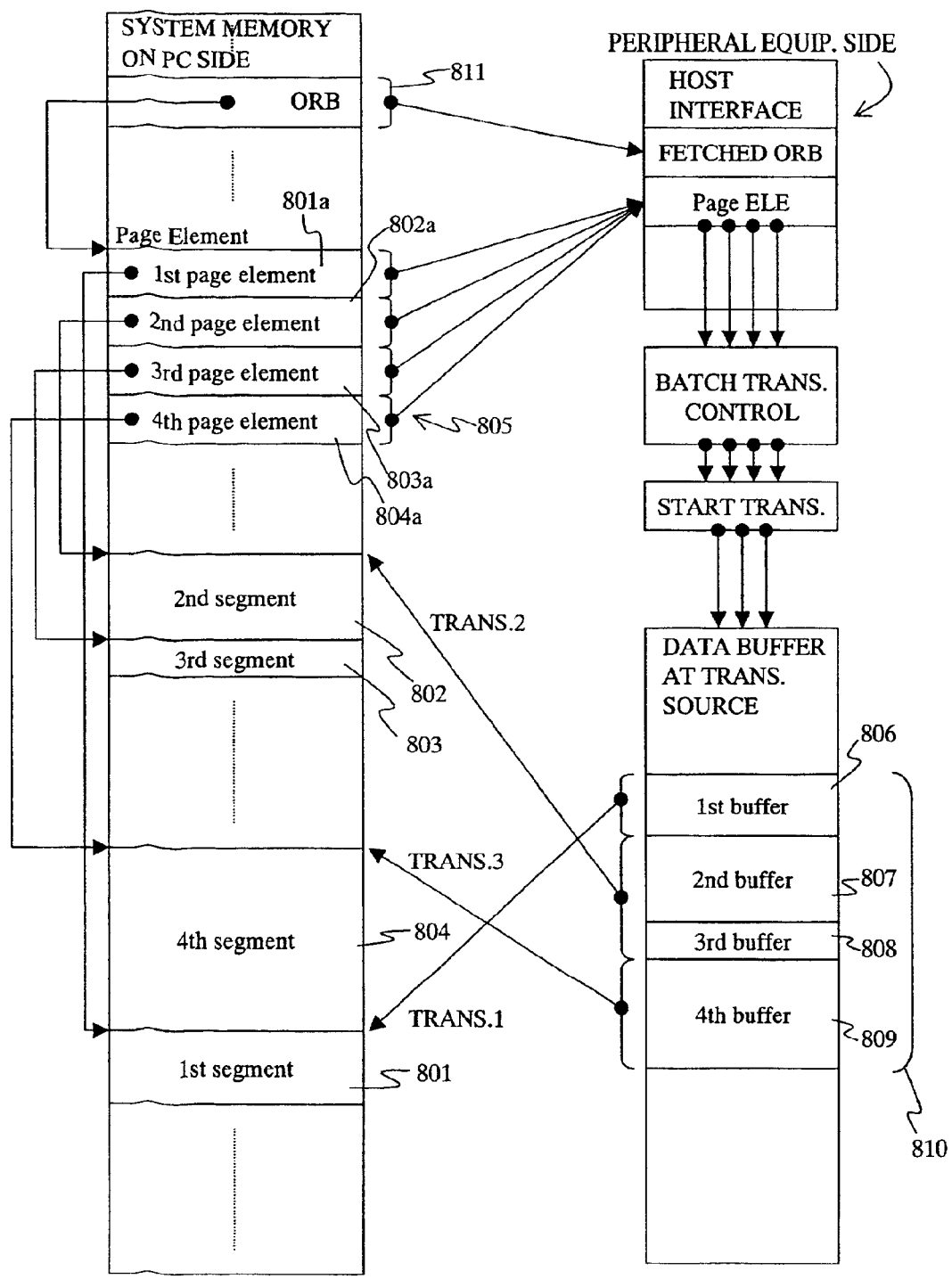
FIG. 8 is a diagram showing a relation in the address space between the host PC and the HDD in Embodiment 1.

FIG. 7 shows a configuration of the data transfer device, and FIG. 8 shows a relation in the address space between the host PC and the HDD.

As shown in FIG. 7, the data transfer device is provided with an acquisition means 701. If an instruction requesting data transfer (read command) is issued in which the address of the page table is specified as transfer destination, acquisition means 701 acquires page information (page element) from the host PC on the basis of the address of the page table.

The address of the page table is acquired from the data_descriptor field of the command block ORB. In the page table, plural page elements are written. The page element includes the address of a page and page length. In the example of FIG. 8, 4 pages (first page 801, second page 802, third page 803, fourth page 804) are assigned in the address space of the host PC side. And in page table 805, page element 801a, 802a, 803a, 804a of the respective pages are written. When the address of page table 805 is specified as transfer destination in the instruction requesting data transfer, these pages are actual transfer destinations.

Acquisition of page element by acquisition means 701 can be materialized by host interface 604 complying with the control of system control section 608, for example. For this, block read provided for in IEEE 1394 is used.

Transfer information setting means 702 sets transfer information including the address of the data transfer source, transfer data length and the address of the data transfer destination on the basis of page element of a page as transfer destination page and information of command block ORB.

In the example of FIG. 8, a series of buffers with the first buffer 806 of the HDD 601 as starting point are specified as data transfer source. The first buffer 806, second buffer 807, third buffer 808, fourth buffer 809 correspond to the first page 801, second page 802, third page 803, fourth page 804 respectively.

The address of the data transfer source is set at the address of the buffer corresponding to the page where data start to be transferred. An initial value of the address of the data transfer source is the address of the first buffer 806. The address of the first buffer 806 is acquired from Logical Block Address field that is in CDB included in the command_block field of command block ORB. The transfer data length is set at a value corresponding to a page length of a page where data is transferred. Furthermore, the address of data transfer destination is set at the addresses of the page where data start to be transferred.

The setting of these pieces of transfer information can be materialized if the microprocessor in the system control section 608 writes a set value in a field corresponding to batch transfer information table 703 assigned in RAM.

Figure 9A:
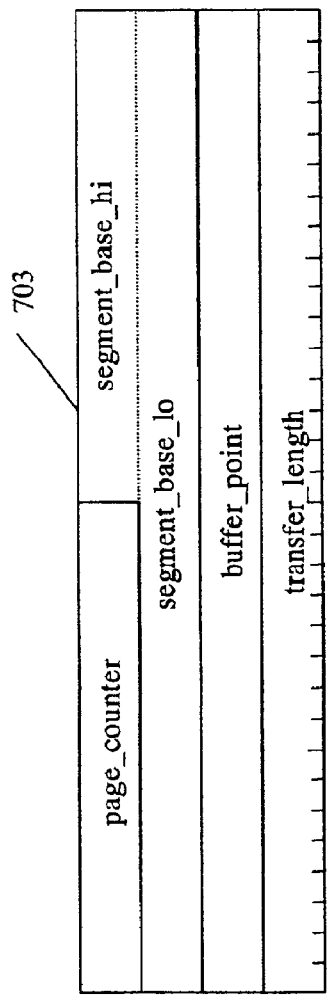
FIG. 9A is a diagram showing a basic configuration of a batch transfer information table in Embodiment 1.
Figure 9B:
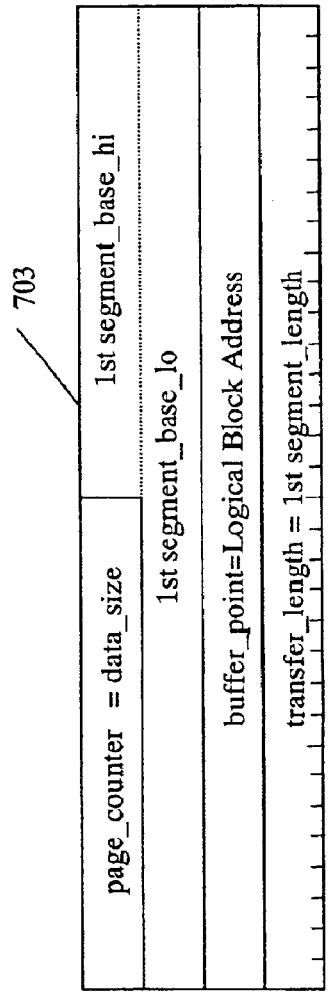
FIG. 9B is a concrete example of the batch transfer information table.

FIGS. 9A and 9B show a configuration of batch transfer information table 703.

As shown in FIG. 9A, batch transfer information table 703 includes page_counter field, segment_base_hi field, segment_base_lo field, buffer_point field and transfer_length field.

The segment_base_hi field and segment_base_lo field are fields where the address of transfer destination (address of the transfer starting page) is set. The buffer_point field is a field where the address of the transfer source (buffer pointer of the transfer source) is set, while the transfer_length field is a field where the transfer data length is set.

Judging means 704 judges whether the page of the transfer destination and other pages form a continuous area where plural pages are consecutive. In FIG. 8, for example, second page 802 and third page 803 are consecutive but third page 803 and fourth page 804 are not consecutive.

Whether the page of the transfer destination and other pages form the continuous area is judged by seeing if a value obtained by adding the transfer data length to the address of the page of the transfer destination agrees with the address of another page, for example.

If it is judged by judging means 704 that the page of the transfer destination and other pages form the continuous area, transfer information changing means 705 changes transfer information according to the continuous area.

The changing of transfer information is effected by the microprocessor of system control section 608 changing the value in the fields of batch transfer information table 703, for example.

Figure 10A:
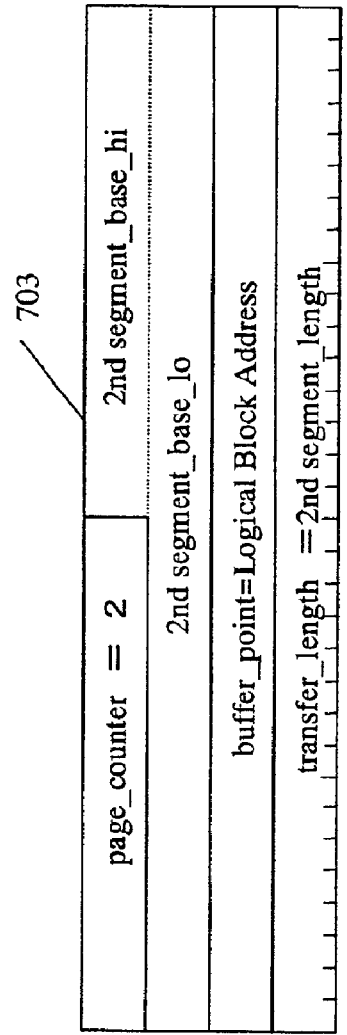
FIG. 10A is a diagram showing a specific transfer information set in the batch transfer information table.

Now, let it be supposed that the address of second page 802 is set in the segment_base_hi field and segment_base_lo field of batch transfer information table 703 and that the page length of second page 802 is set in the transfer_length field as shown in FIG. 10A.

Figure 10B:
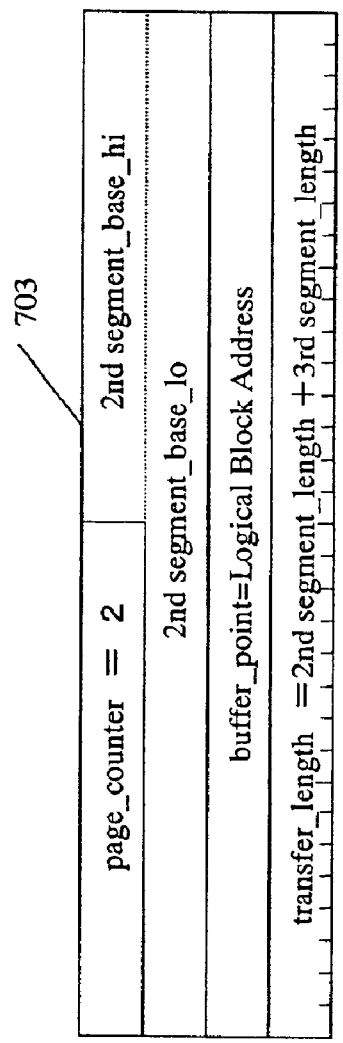
FIG. 10B is a diagram showing the changed transfer information set in the batch transfer information table.

In this case, transfer information changing means 705 changes the value in the transfer_length field according to the continuous area formed of second page 802 and third page 803 as shown in FIG. 10B. That is, the value is changed to a value obtained by adding the page length of third page 803 to the page length of second page 802.

Data transfer control means 706 controls data transfer on the basis of transfer information, in this case the value in each field of batch transfer information table 703.

Host interface 604 complies with control of data transfer control means 706 and transfers data at an address specified by data transfer control means 706.

Now, the operation of HDD 601 thus constituted will be explained in detail.

First, the host PC issues instruction requesting data transfer (read command) to request HDD 601 to transfer data. For this command, command block ORB is used. As shown in FIG. 8, command block ORB 811 is prepared in the system memory on the PC side. The host PC informs HDD 601 of the address of command block ORB. Informed of the address, the host interface 604 of HDD 601 fetches command block ORB from PC.

Next, the page_table_present bit value of command block ORB is referred to.

If the value is 0, the address of the memory of PC is directly specified in the data_descriptor field. In this case, the specified data is transferred at that address.

If the page_table_present bit value is 1, on the other hand, the data transfer is controlled by the data transfer device.

Figure 11:
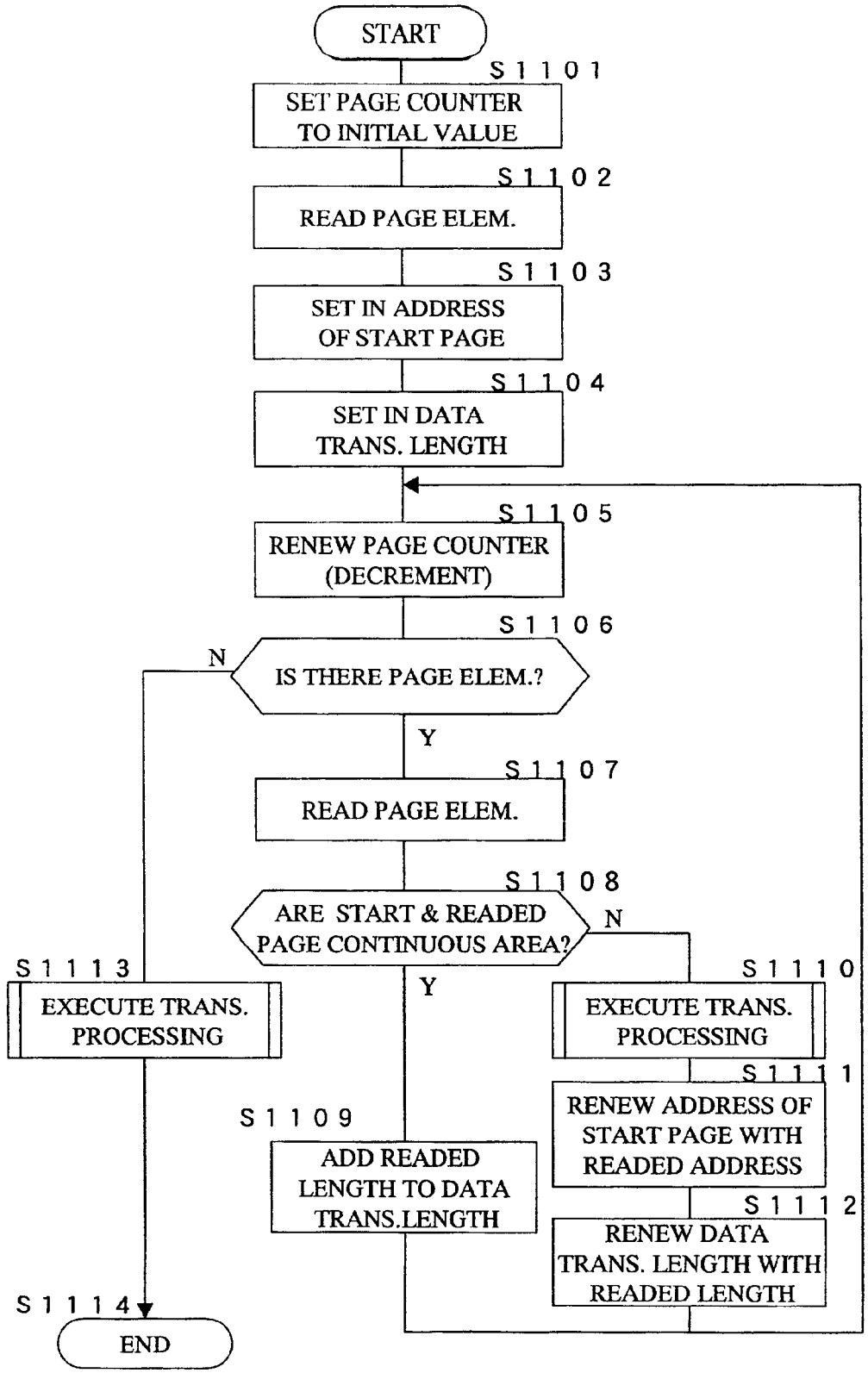
FIG. 11 is a flow chart showing a data transfer method in Embodiment 1.

FIG. 11 is a flow chart illustrating an operation of the data transfer device.

If the page_table_present bit value is 1, the data transfer device sets an initial value at batch transfer information table 703 (Step S 1101).

Then, in the page_counter field (hereinafter referred to as "page counter"), the total number of pages (value in the data_size field) specified by ORB is set as an initial value, as shown in FIG. 9B. In the example of FIG. 8, the value of the data_size field is 4. In buffer_point field, data read position specified by ORB (value of Logical Block Address) is set as an initial value.

Next, acquisition means 701 acquires page element 801a of first page 801 from page table 805 (Step S 1102).

Next, transfer information setting means 702 sets the address of first page 801 contained in page element 801a in the segment_base_hi field and segment_base_lo field of batch transfer information table 703 (Step S 1103). In addition, the page length of first page 801 is set in the transfer_length field (Step S 1104).

Next, the value of the page counter is decremented by 1 (Step S 1105).

As a result, if the value of the page counter is not smaller than 1, it is judged that there exists page elements that are not acquired, and Step S 1107 is performed.

In Step S 1107, acquisition means 701 acquires page element 802a of second page 802 subsequent to page element 801a of first page 801 from page table 805. By the way, the size of page element is 8 bytes. Therefore, the address of page element 802a of second page 802 is obtained by adding 8 bytes to the address in page table 805 (address of page element 801a of first page 801).

Next, judging means 704 judges whether first page 801 and second page 802 form a continuous area (Step S 1108). In this judgement, the address and page length of first page 801 evacuated in batch transfer information table 703 are used. If a value obtained by adding the page length of first page 801 to the address of first page 801 agrees with the address of second page 802, it is judged that first page 801 and second page 802 form a continuous area.

If it is judged by judging means 704 that first page 801 and second page 802 form a continuous area, transfer information changing means 705 changes transfer information in batch transfer information table 703 according to the continuous area (Step S 1109). In this case, after Step S 1109, Step S 1105 is repeated.

In the example of FIG. 8, no pages are assigned after first page 801 and therefore judging means 704 judges that no continuous area is formed. And transfer information changing means 705 will not change transfer information.

In this case, data transfer control means 706 controls data transfer on the basis of transfer information. Thereby, transfer processing is effected (Step S 1110).

Figure 12:
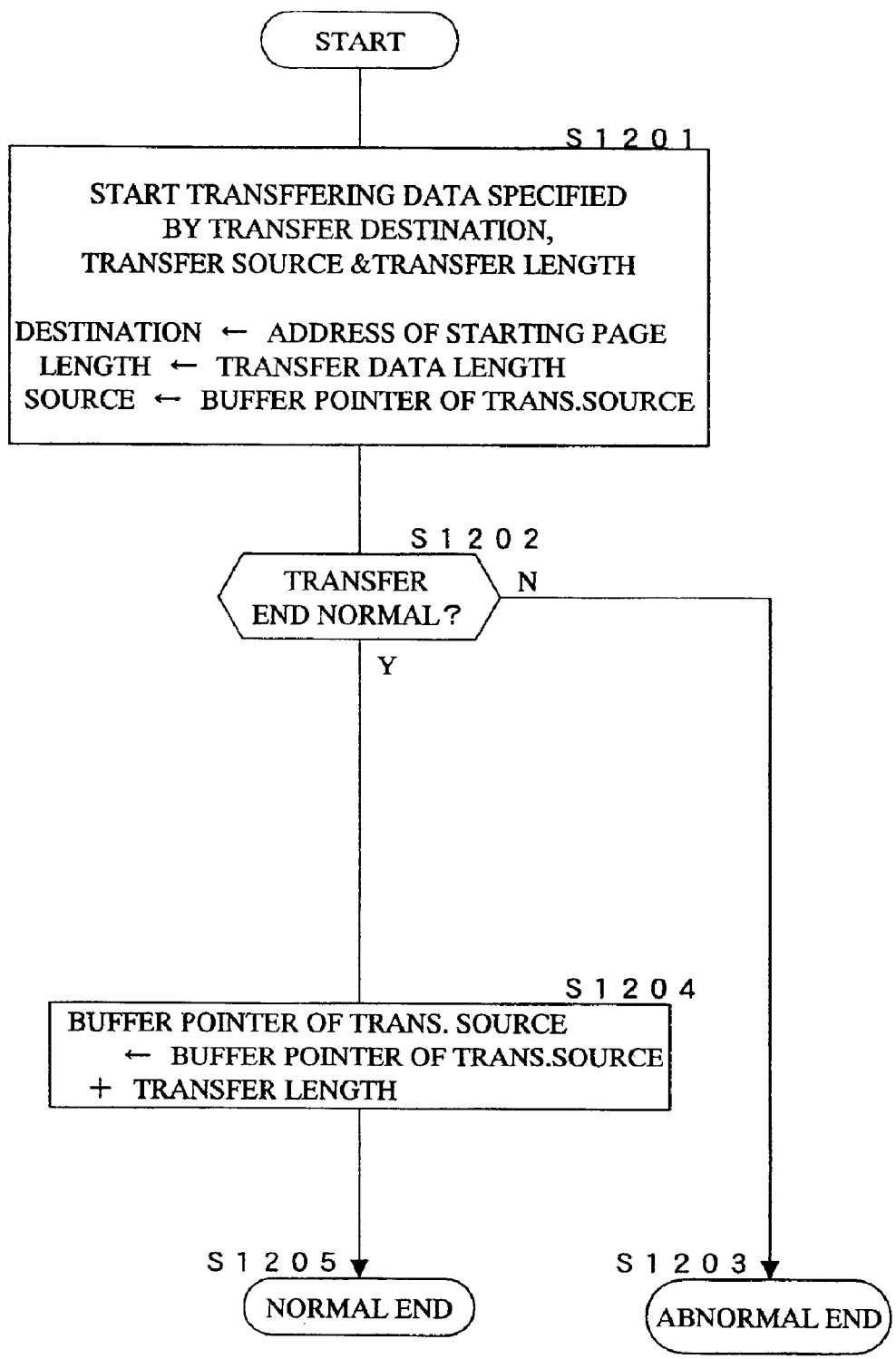
FIG. 12 is a flow chart showing transfer processing in detail in Embodiment 1.

FIG. 12 is a flow chart illustrating the transfer processing.

First, the respective parameters (transfer destination, transfer source, transfer length) to activate a communication controller are set. For the transfer destination, the values of segment_base_hi field and segment_base_lo field of batch transfer information table 703 are used. For the transfer source, the value of the buffer_point field is used. For the transfer length, the value of the transfer_length field is used. And the communication controller controls the operation timing of each section according to a built-in processing program and transfers data in accordance with the parameters (Step S 1201).

And it is judged whether an error occurs in data transfer (Step S 1202). If an error occurs in data transfer, the process ends with an error (Step S 1203).

If the data transfer ends normal without an error, on the other hand, a buffer pointer of the transfer source, that is, the value in the buffer_point field of batch transfer information table is renewed (Step S 1204). The value of this field is renewed to be a value obtained by adding the transfer length to the original value. Through this renewal, the value in the buffer_point field is set at the address of the next buffer. When the value of the buffer_point field is set at the address of first buffer 806 (value of Logical Block Address), the value becomes equal to the value of second buffer 807.

If the buffer pointer of the transfer source is renewed, the data transfer ends normal (Step S 1205). And Step S 1111, S1112 are performed.

In the two steps, transfer information setting means 702 renews batch transfer information table 703. In Step S 1111, the values of the segment_base_hi field and the segment_base_lo field are set at the address of second page 802 acquired in Step S 1107.

In Step S 1112, the value of the transfer_length field is set at the page length of second page 802 acquired in Step S 1107.

If batch transfer information table 703 is renewed, Step S 1105 is repeated. Thereby, the value of the page counter becomes 2. FIG. 10A shows the state of batch transfer information table 703 at that time. The value of the page counter is not smaller than 1, and therefore Step S 1107 is performed. And page element 803a of third page 803 subsequent to page element 802a of second page 802 is acquired by acquisition means 701. And in Step S 1108, judging means 704 judges whether second page 802 and third page 803 form a continuous area. In the example of FIG. 8, the value obtained by adding the page length to the address of second page 802 agrees with the address of third page 803, and therefore it is judged that the continuous area is formed. In this case, Step S 1109 is performed, and the page length of third page 803 acquired by transfer information changing means 705 in Step S 1107 is added to the value in the transfer_length field. FIG. 10B shows a state of batch transfer information table 703 at that time. The value of the transfer_length field becomes a value obtained by adding the page length of third page 803 to the page length of second page 802.

If Step S 1109 is performed, Step S 1105 is carried out. The value of the page counter is reduced by 1 and becomes 1. That is, the value of the page counter is not smaller than 1. For this reason, Step S 1107 is performed, and page element 804a of fourth page 804 is acquired by acquisition means 701. In the example of FIG. 8, third page 803 and fourth page 804 are not consecutive, and according to the judgement in Step S 1108, Step S 1110 is performed.

Then, the address of the transfer source set in batch transfer information table 703 is the address of second buffer 807, while the transfer data length is a value obtained by adding the page length of third page 803 to the page length of second page 802.

That is, in Step S 1110, data of not only second buffer 807 but also third buffer 808 are transferred at the address of second page 802.

Consequently, data of second buffer 807 and third buffer 808 are transferred by the lump.

If transfer is effected, Step S 1111 and Step S 1112 are performed. The values of the segment_base_hi field and the segment_base_lo field in batch transfer information table 703 are set at the address of fourth page 804 acquired in Step S 1107. The value of the transfer_length field is set at the page length of fourth page 804 acquired in Step S 1107. And furthermore, Step S 1105 is performed. If Step S 1105 is performed and the value of the page counter is decremented by 1, the value of the page counter becomes 0. Because the value of the page counter is no longer not smaller than 1, Step S 1113 and not Step S 1107 is performed.

In Step S 1113 as in Step S 1110, transfer processing is executed. Thereby, data of fourth buffer 809 is transferred at fourth page 804.

And the data transfer device ends the process (Step S 1114).

In this example, the total number of pages is 4, while the number of executed transfer processings is 3.

When the data transfer is controlled as described, the number of settings of address is reduced, thereby improving the efficiency of data transfer processing.

Embodiment 2

In Embodiment 1, acquisition means 701 acquires page elements one by one. In Embodiment 2, on the other hand, acquisition means 701 acquires plural page elements by the lump.

The configuration of the data transfer device is basically identical with that described in Embodiment 1. In the present embodiment, however, plural page elements are acquired by the lump, and the more areas have to be allocated in batch transfer information table 703 in which those values are set.

FIG. 13 shows a configuration of batch transfer information table 703 in Embodiment 2.

As shown in FIG. 13, batch transfer information table 703 in Embodiment 2 includes the page_counter field, transfer_length field and buffer_point field as fields where transfer information is written and also fields where n pieces of page elements are registered.

The fields where page element is registered comprise a segment_length field, segment_base_hi field and segment_base_lo field. In the segment_length field, the page length of each page is set. In the segment_base_hi field and segment_base_lo field, the address of each page is set. These fields where page element is registered are each prepared in 256 pieces, for example.

Figure 14:
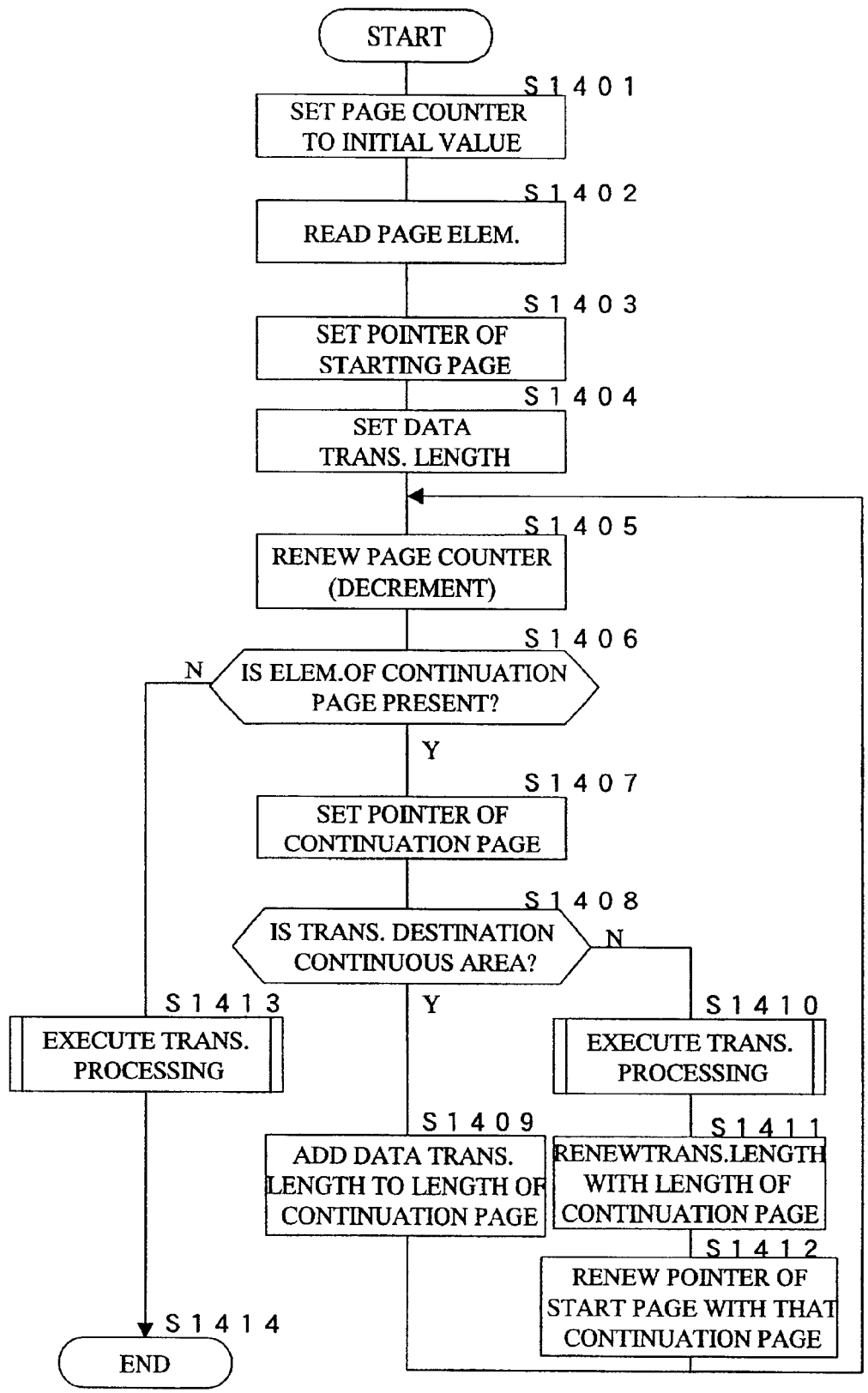
FIG. 14 is a flow chart showing data transfer method in Embodiment 2.
Figure 15:
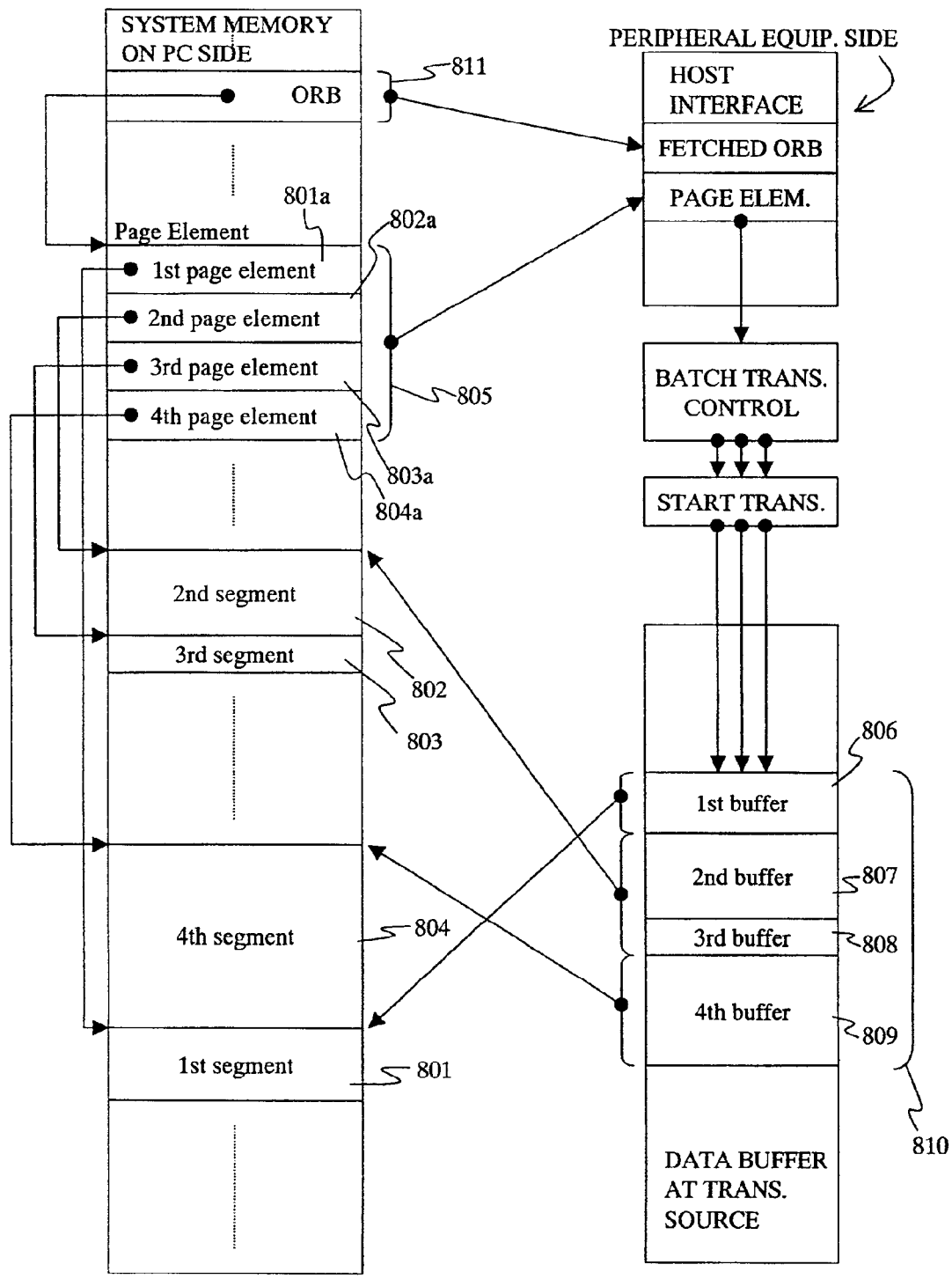
FIG. 15 is a diagram showing a relation in address space between the host PC and the HDD in Embodiment 2.

FIG. 14 shows a relation of address space between the host PC and the HDD in Embodiment 2. FIG. 15 is a flow chart illustrating the operation of the data transfer device in Embodiment 2.

If the value of page_table_present bit is 1, the data transfer device sets initial values at batch transfer information table 703 (Step S 1401).

Then, the page counter is set at the total number of pages specified by ORB (value of data_size field) as an initial value. In the example of FIG. 15, the value of the data_size field is 4. The buffer_point field is set at the read position specified by ORB (value of Logical Block Address) as an initial value.

Next, acquisition means 701 acquires page elements from first page 801 to fourth page 804 by the lump from page table 805 on the basis of the addresses of the page table specified by ORB (Step S 1402). Transfer information setting means 702 registers with batch transfer information table 703 plural page elements acquired by the lump. Then, page elements are registered according to the order of page tables starting with the head field of batch transfer information table 703.

Next, transfer information setting means 702 sets a pointer to specify page element of the starting page in the start_page field of batch transfer information table (Step S 1403). The starting page is a page to which data start to be transferred. Here, the pointer specifies page element 801a of first page 801 registered with batch transfer information table 703.

Transfer information setting means 702 sets the page length, which is contained in page element 801a of first page 801 the pointer of the starting page points to, in the transfer_length field of batch transfer information table 703 (Step S 1404).

Next, the value of the page counter is decremented by 1 (Step S 1405).

Consequently, if the value of the page counter is not smaller than 1, it is judged in Step S 1406 that there is a continuation page, and Step S 1407 is performed. The continuation page is to be a page other than the starting page where data is transferred at this time of data transfer started with the starting page or to be the starting page at next time.

Figure 16:
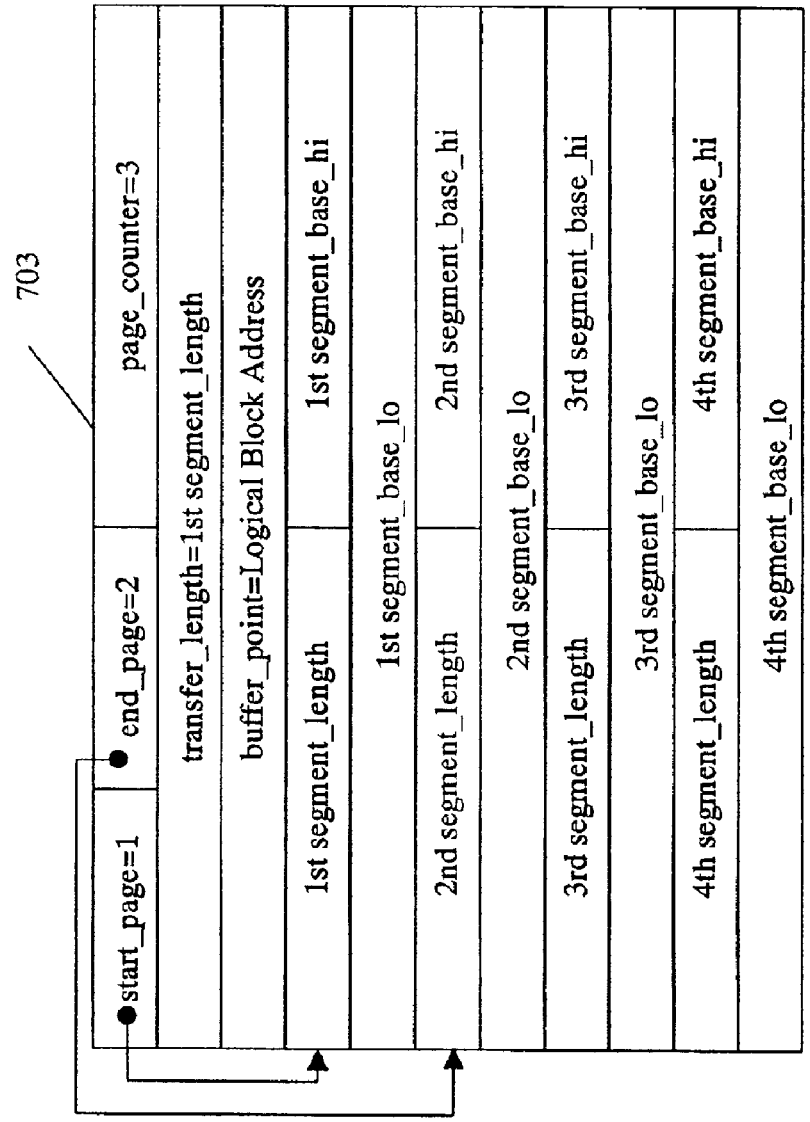
FIG. 16 is a diagram showing an example of the state of batch transfer information table in Embodiment 2.

In Step S 1407, the pointer to specify page element of the continuation page is set in the end_page field of batch transfer information table 703. Here, a pointer that specifies page element 802a of second page 802 registered next to page element 801a of first page 801 in batch transfer information table 703 is set. FIG. 16 shows the state of batch transfer information table 703 at that time.

In the state shown in FIG. 16, the pointer to point to page element 801a of first page 801 is set in the start_page field, and the pointer to point to second page 802 of second page 802 is set in the end_page field. The value of the page counter, which is decremented from 4 by 1, is 3. In the transfer_length field, the page length of first page 801 is set as an initial value. In the buffer_point field, the read position of data is set.

Next, judging means 704 judges whether first page 801 to be the starting page and second page 802 to be the continuation page form a continuous area (Step S 1408). This judgement is made using the address, the page length of first page 801 and the address of second page 802 obtained by the pointers of the starting page and continuation page. The judgement itself is made in the same way as in Embodiment 1.

If it is judged by judging means 704 that first page 801 and second page 802 form a continuous area, transfer information changing means 705 changes transfer information of batch transfer information table 703 according to the continuous area (Step S 1409). In this case, after Step S 1409, Step S 1405 is repeated.

In the example of FIG. 15, no other pages are assigned after first page 801, and therefore judging means 704 judges that no continuous area is formed. And transfer information changing means 705 does not change transfer information.

In this case, data transfer control means 706 controls data transfer on the basis of transfer information. Thereby, transfer processing is executed (Step S 1410).

The transfer processing is the same as in Embodiment 1 in that the respective steps in FIG. 12 are performed.

In the Step S 1201, however, the values of the 1st segment_base_hi field and the 1st segment_base_lo field contained in page element 801*a* to which the pointer of the starting page points, out of page element registered in batch transfer information table 703, are used for transfer destination.

In Step S 1203, the value of the buffer_point field becomes a value obtained by adding the transfer length of the transferred data of first buffer 806 to the original value. This is equal to the address of the second buffer 807. If the transfer is executed, then Step S 1411 and Step S 1412 are performed.

In the two steps, transfer information setting means 702 renews batch transfer information table 703. In Step S 1411, the value of the transfer_length field is set at the page length of the continuation page. In Step S 1412, the value in the start_page field is set at the value of the end_page field.

If batch transfer information table 703 is thus renewed, Step S 1405 is repeated. Thereby, the value of the page counter becomes 2. Because the value of the page counter is not smaller than 1, Step S 1407 is performed, and the pointer to point to page element 803*a* of third page 803 registered next to page element 802*a* of second page 802 in batch transfer information table 703 is set in the end_page field. And, in Step S 1408, it is judged by judging means 704 whether second page 802 and third page 803 form a continuous area. In the example of FIG. 15, a value obtained by adding the page length to the address of second page 802 agrees with the address of third page 803, and it is judged that the continuous area is formed. In this case, Step S 1409 is performed, and transfer information changing means 705 adds to the value of the transfer_length field the page length of third page 803 the pointer of the continuation page points to. The value of transfer_length field becomes a value obtained by adding the page length of third page 803 to the page length of second page 802.

If Step S 1409 is performed, then Step S 1405 is carried out. The value of the page counter is reduced by 1 and becomes 1, and satisfies the condition that the value of the page counter be not smaller than 1. Therefore, Step S 1407 is performed, and the pointer that points to page element 804*a* of fourth page 804 registered next to page element 803*a* of third page 803 is set in the end_page field. In the example of FIG. 15, third page 803 and fourth page 804 are not consecutive, and according to the judgement from Step S 1408, Step S 1410 is performed.

Figure 17:
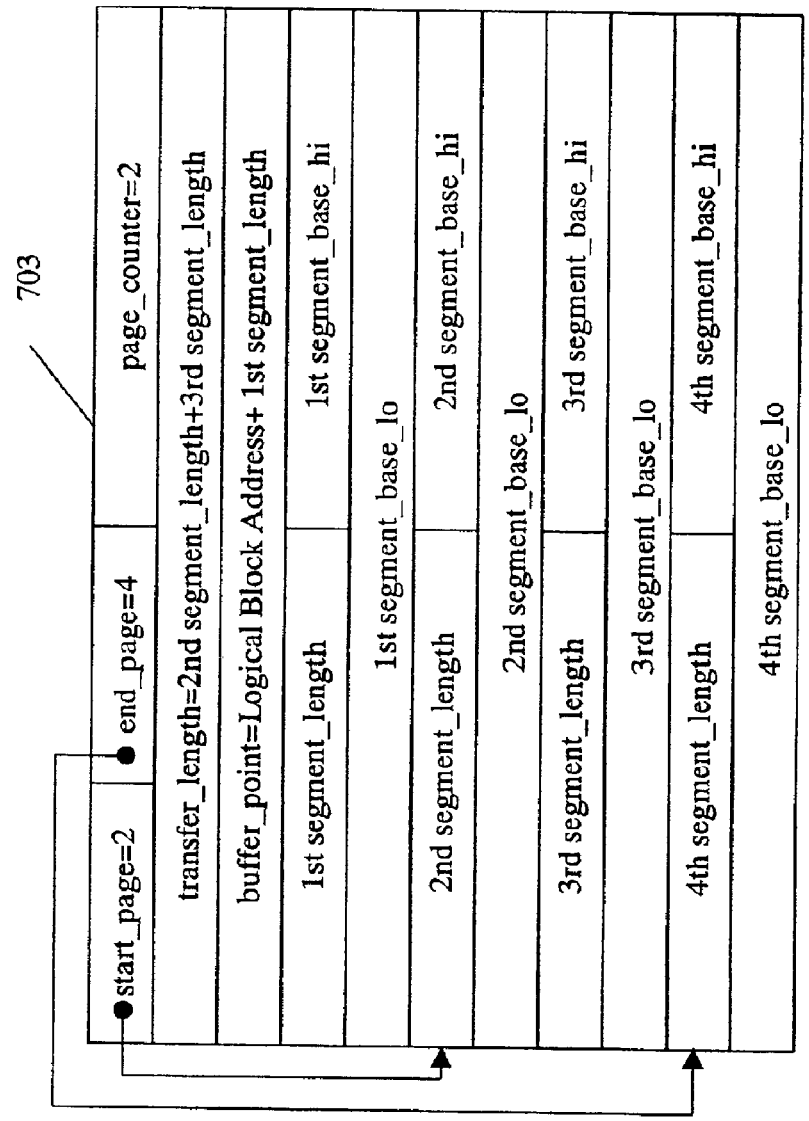
FIG. 17 is a diagram showing another example of the state of batch transfer information table in Embodiment 2.

FIG. 17 shows the state of batch transfer information table 703 at that time.

The address of the transfer source set at batch transfer information table 703 is the address of second buffer 807, while the transfer data length is a value obtained by adding the page length of third page 803 to the page length of second page 802, as shown in FIG. 17.

That is, in Step S 1409, not only data of second buffer 807 but also data of third buffer 808 are transferred at the address of second page 802.

Consequently, data of second buffer 807 and third buffer 808 are transferred by the lump. It is noted that in transfer processing, the transfer lengths of the transferred data of second buffer 807 and third buffer 808 are added to the value in the buffer_point field.

If the transferring is effected, Step S 1411 and Step S 1412 are performed. The value of the transfer_length field in batch transfer information table 703 is set at the page length of fourth page 804. In addition, a pointer to specify page element 804*a* of fourth page 804 is set in the start_page field. Furthermore, Step S 1405 is performed. If Step S 1405 is performed and the page counter is decremented by 1, the value of the page counter becomes 0. Because the value of the page counter is no longer not smaller than 1, Step S 1413, and not Step S 1407, is performed.

In Step S 1413 as in Step S 1410, transfer processing is effected. Thereby, data of fourth buffer 809 is transferred to fourth page 804.

And the data transfer device ends the process (Step S 1414).

In this example, too, the total number of pages is 4, but the number of executed transfer processings is 3. If the data transfer is controlled that way, the number of settings of address is reduced, thereby improving the efficiency of the data transfer processing. In addition, since page elements are acquired by the lump, still higher speed of transfer control can be materialized.

Embodiment 3

In Embodiment 2, to be judged that plural pages form a continuous area, it is required that the order or sequence of addresses of these pages be identical with the order in the page table (order of addresses of the corresponding buffers).

In Embodiment 3, on the other hand, if plural pages are consecutive, it is judged that those pages form a continuous area even if the order of addresses of those pages are not identical with the order in the page table.

Figure 18:
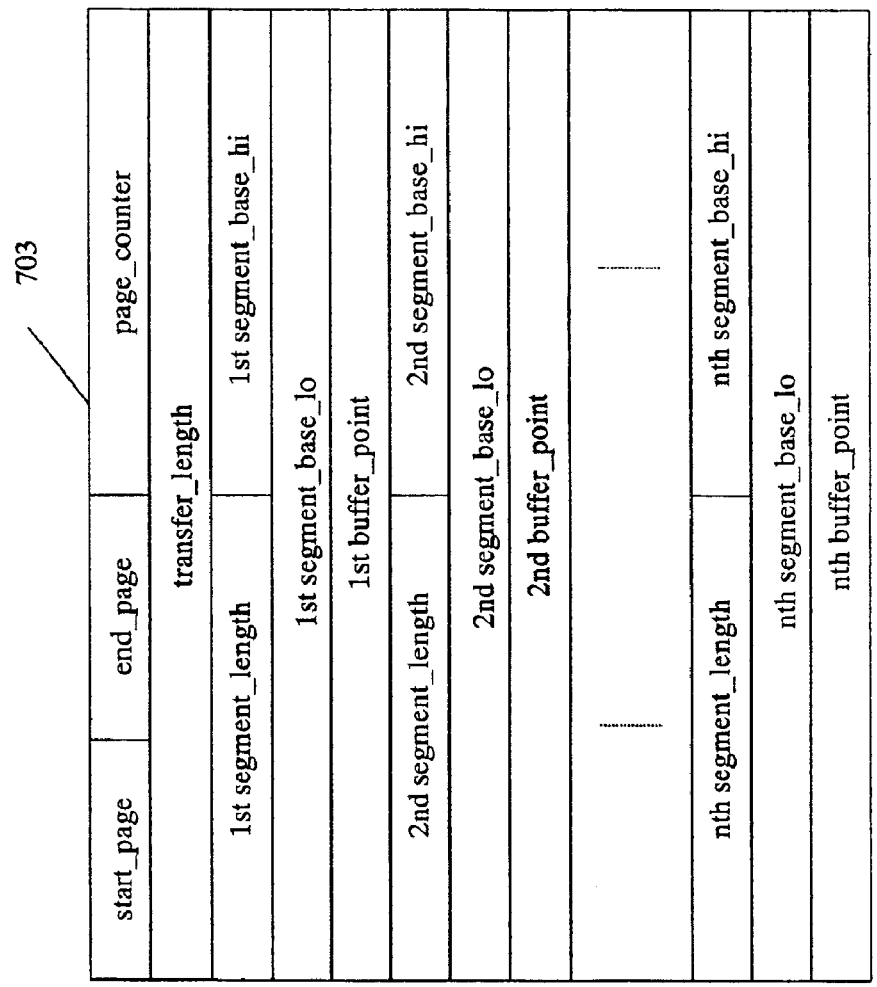
FIG. 18 is a diagram showing a configuration of batch transfer information table in Embodiment 3.

Therefore, batch transfer information table 703 in Embodiment 3 is provided with a buffer_point field where a transfer source address is written for each field in which page element is registered as shown in FIG. 18.

Figure 19:
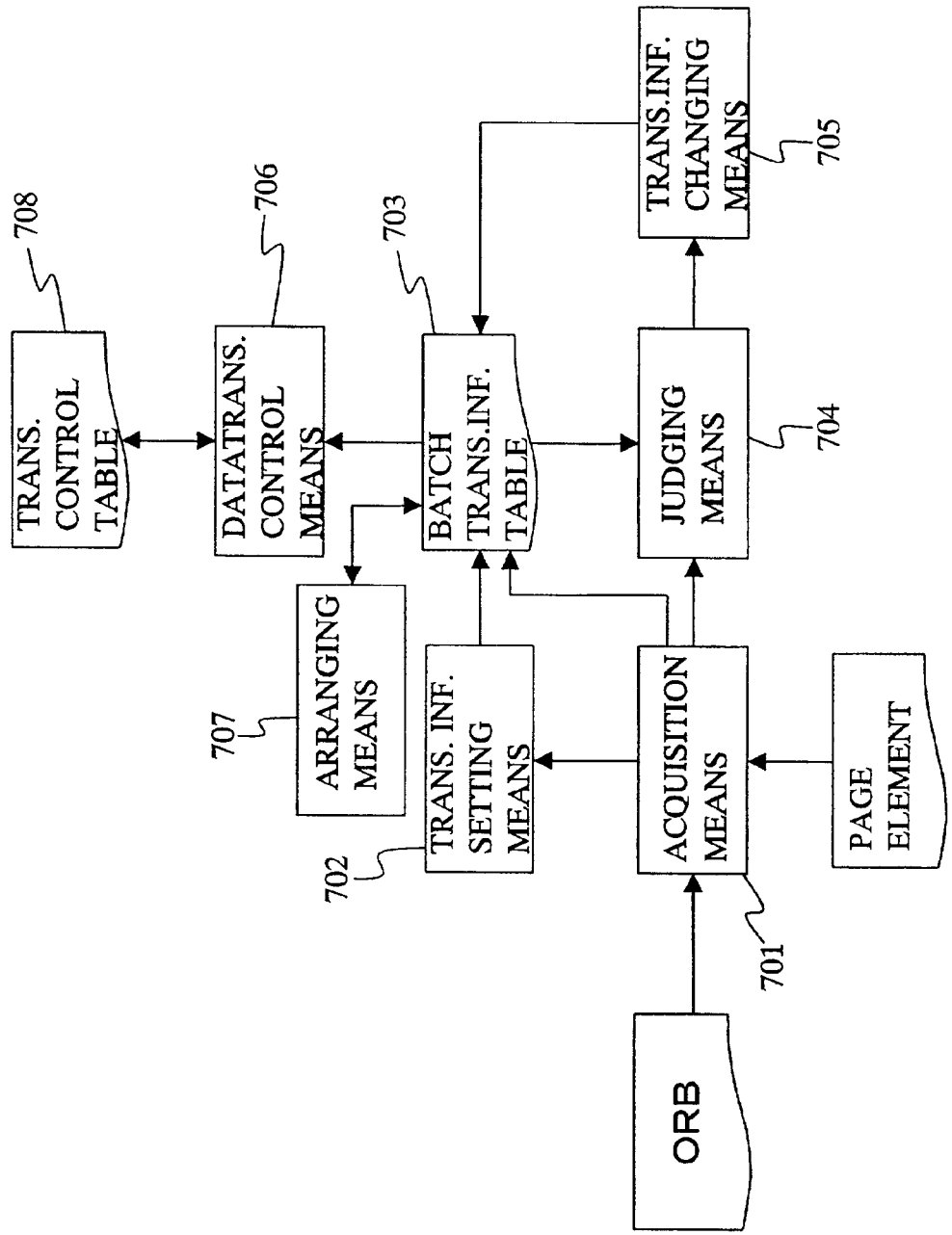
FIG. 19 is a schematic diagram showing a configuration of the data transfer device in Embodiment 3.

Furthermore, the data transfer device is provided with arranging means 707 in addition to means in Embodiments 1 and 2 as shown in FIG. 19.

Arranging means 707 arranges plural page elements acquired by the lump and the values in the buffer_point field according to increasing order of addresses of pages.

Figure 20:
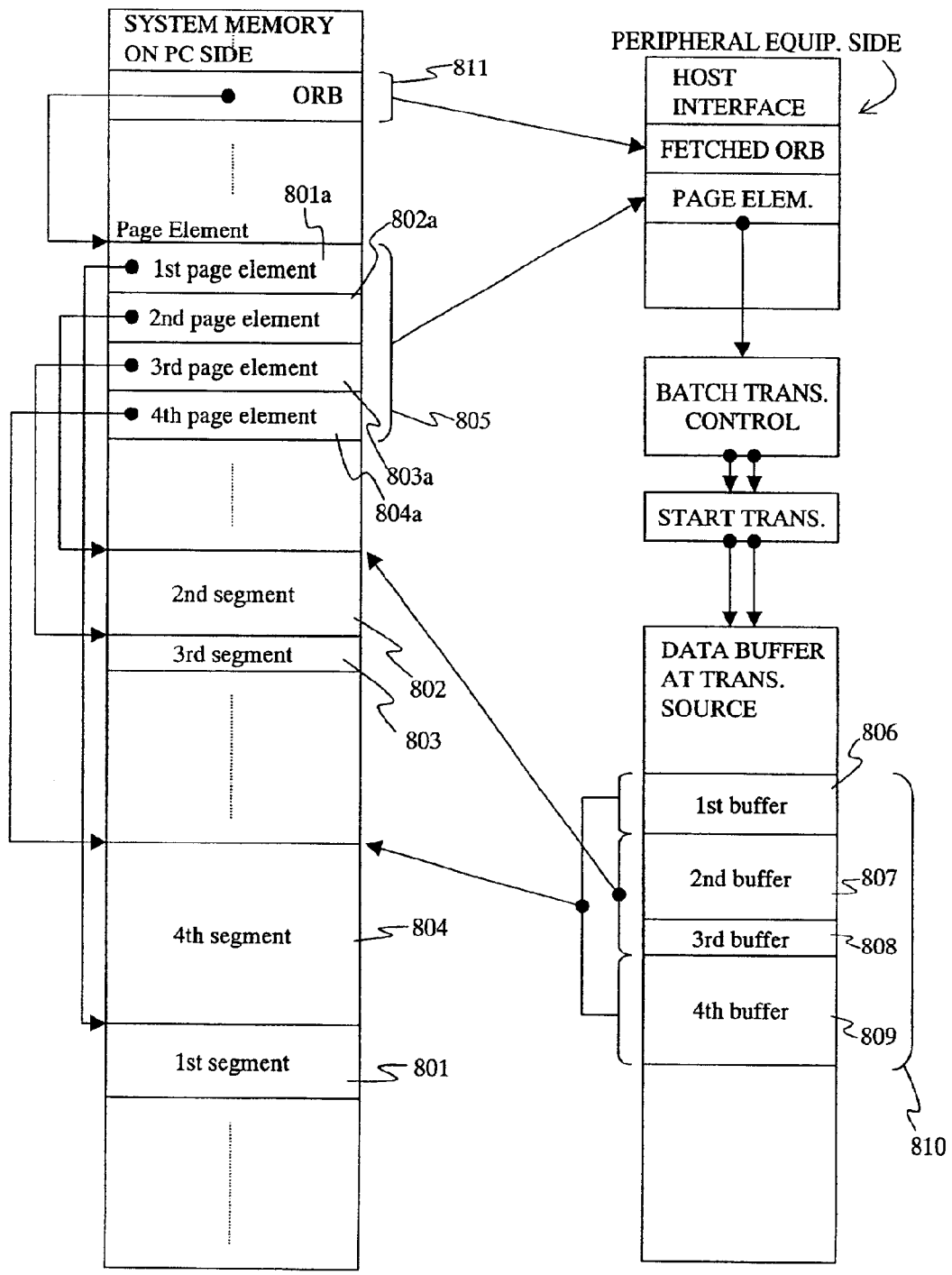
FIG. 20 is a diagram showing the relation in address space between the host PC and the HDD in Embodiment 3.
Figure 21:
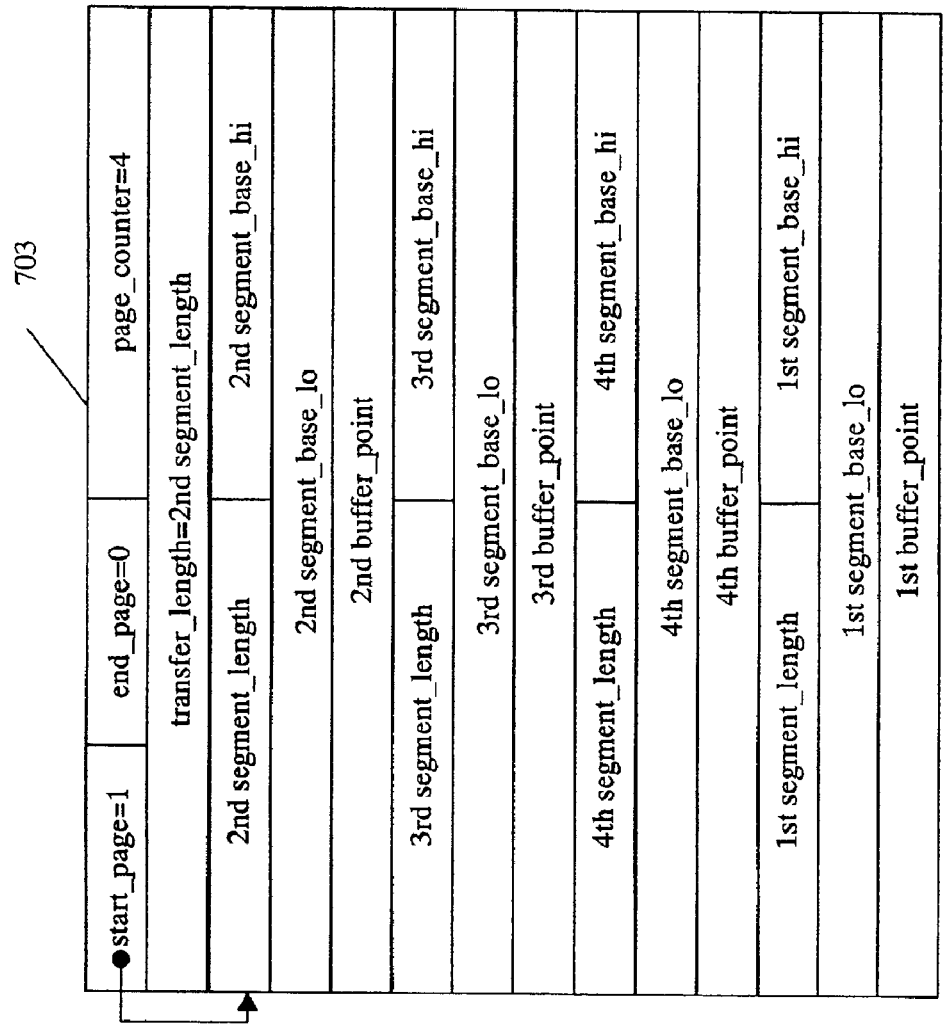
FIG. 21 is a diagram showing an example of the state of batch transfer information table in Embodiment 3.

Now, let it be supposed that pages are assigned in the address space of the host PC as shown in FIG. 20, for example. These pages are assigned according to the address order or sequence, that is, second page 802, third page 803, fourth page 804, first page 801. Arranging means 707 arranges pieces of area information (page elements) and transfer source addresses according to that order as shown in FIG. 21.

Figure 22:
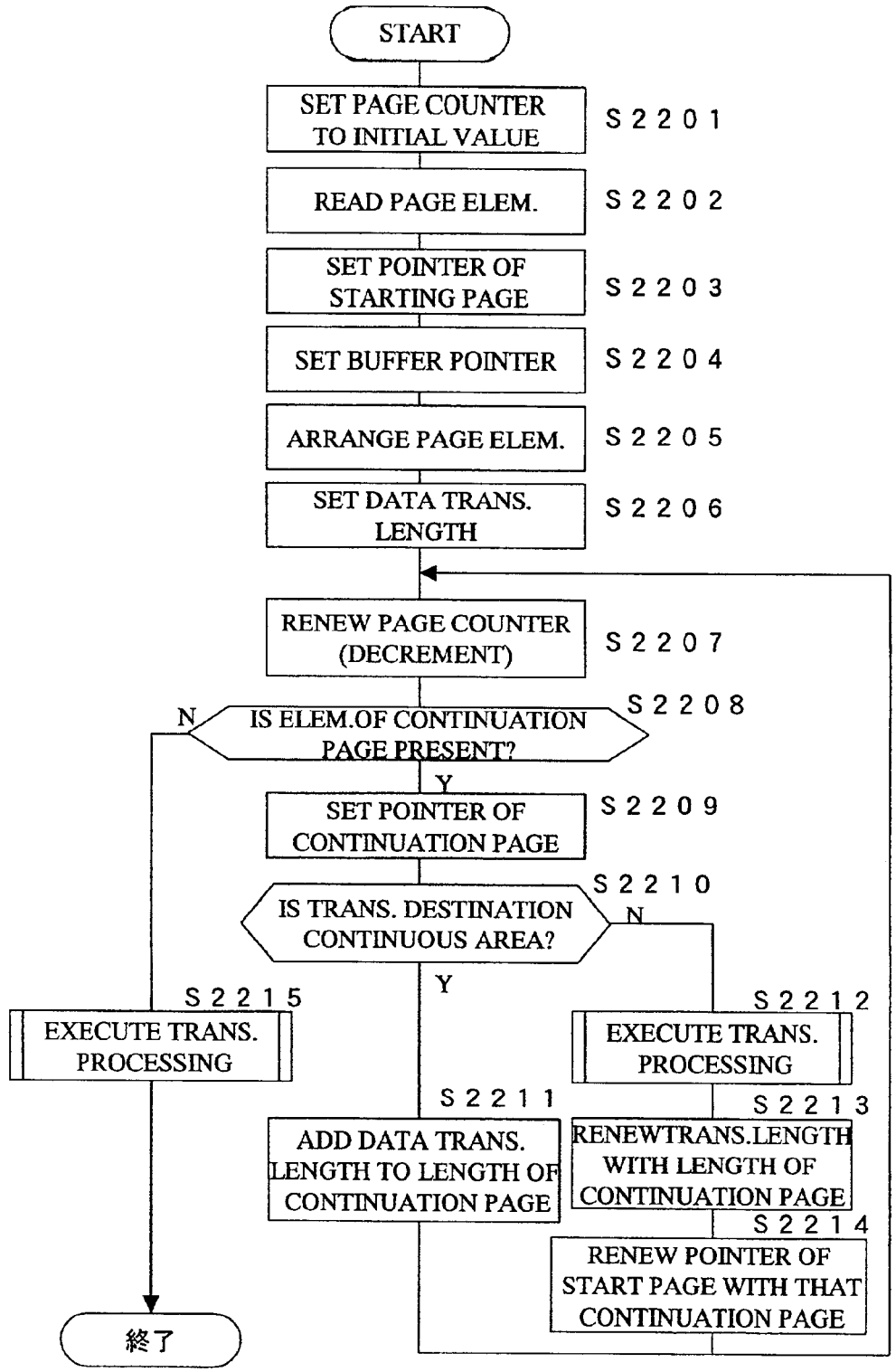
FIG. 22 is a flow chart showing data transfer method in Embodiment 3.

FIG. 22 is a flow chart illustrating the operation of the data transfer device in Embodiment 3.

If the value of the page_table present bit is 1, the data transfer device sets initial values at batch transfer information table 703 (Step S 2201).

Then, in the page counter, the total number of pages specified by ORB (value of the data_size field) is set as an initial value. In the example of FIG. 20, the value of the data_size field is 4.

Next, acquisition means 701 acquires page elements from first page 801 to fourth page 804 from page table 805 by the lump on the basis of the address in the page table specified by ORB (Step S 2202). Transfer information setting means 702 registers page elements acquired by the lump in batch transfer information table 703.

Next, transfer information setting means 702 sets a pointer to specify page element of the starting page in the start_page field of batch transfer information table 703

(Step S 2203). Here, the pointer to specify page element 801a of first page 801 out of page elements registered with batch transfer information table 703 is set.

Figure 23:
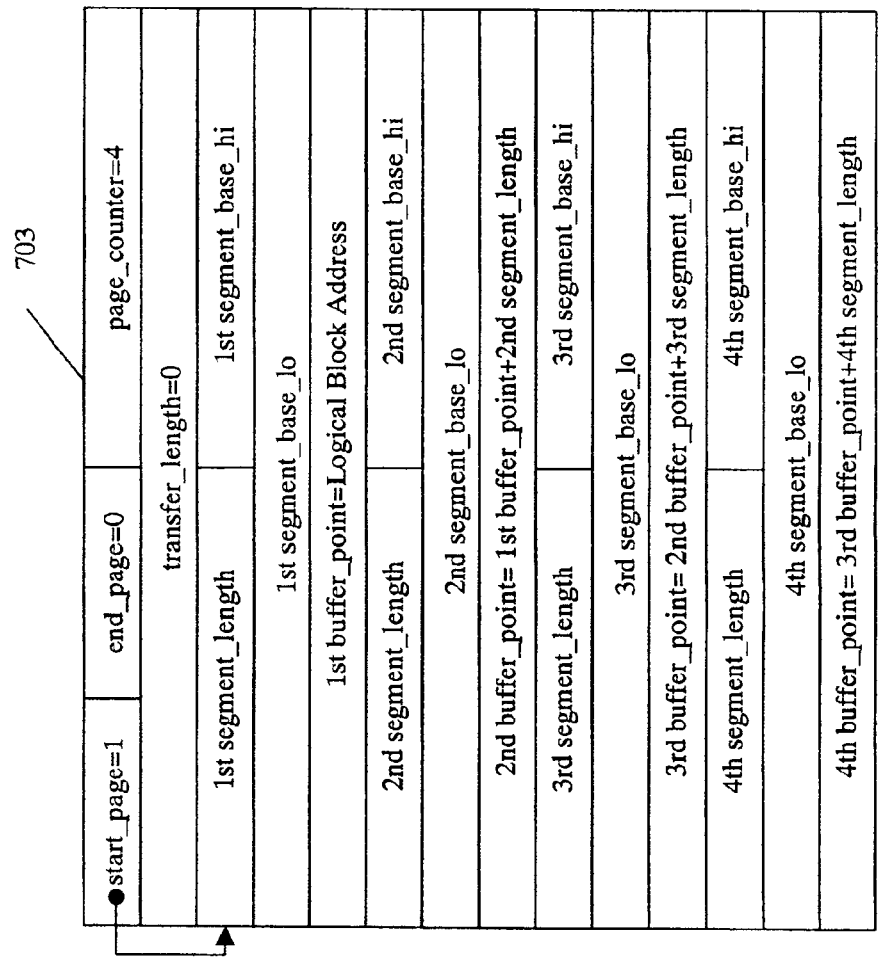
FIG. 23 is a diagram showing another example of the state of batch transfer information table in Embodiment 3.

Next, transfer information setting means 702 sets a value in the buffer_point field of each page (Step S 2204). FIG. 23 shows a state of batch transfer information table 703 at that time.

As shown in FIG. 23, the data read position (value of Logical Block Address) is set in the 1st buffer_point field of first page 801. In the buffer_point fields of other pages, values obtained by adding the page length to the value of the buffer_point field of the previous page are respectively set. In the 2nd buffer_point field of second page 802, for example, a value obtained by adding the value of the 2nd segment_length field of second page 802 to the value of the 1st buffer_point field of first page 801 is set.

Next, arranging means 707 rearranges page elements of the respective pages registered in batch transfer information table 703 according to increasing order of addresses (Step S 2205). FIG. 21 shows the state of batch transfer information table 703 at that time. As a result of the rearrangement, the pointer of the starting page points to not page element 801a of first page 801 registered in batch transfer information table 703 but page element 802a of second page 802.

In the transfer_length field of batch transfer information table 703, furthermore, transfer information setting means 702 sets the page length contained in page element 802a of second page 802 the pointer of the starting page points to (Step S 2206).

Next, the value of the page counter is decremented by 1 (Step S 2207).

As a result, if the page counter is not smaller than 1, it is judged in Step S 2208 that there is the continuation page, and Step S 2209 is performed.

In Step S 2209, a pointer to specify page element of the continuation page is set in the end_page field of batch transfer information table 703. Here, the pointer to specify page element 803a of third page 803 registered next to page element 802a of second page 802 in batch transfer information table 703 is set.

Next, judging means 704 judges whether second page 802 to be the starting page and third page 803 to be the continuation page form a continuous area (Step S 2210). This judgement is made using the address of second page 802, the page length and address of third page 803 acquired by the pointers of the starting page and the continuation page. The judgement itself is made in the same way as in Embodiment 1. In the example of FIG. 20, since a value obtained by adding the page length to the address of second page 802 agrees with the address of third page 803, it is judged that the continuous area is formed.

If judging means 704 judges that second page 802 and third page 803 form the continuous area, transfer information changing means 705 changes transfer information in batch transfer information table 703 according to the continuous area (Step S 2211).

In this case, the page length contained in page element of third page 803 the pointer of the continuation page points to is added to the value of the transfer_length field, whereby transfer information is changed.

Figure 24:
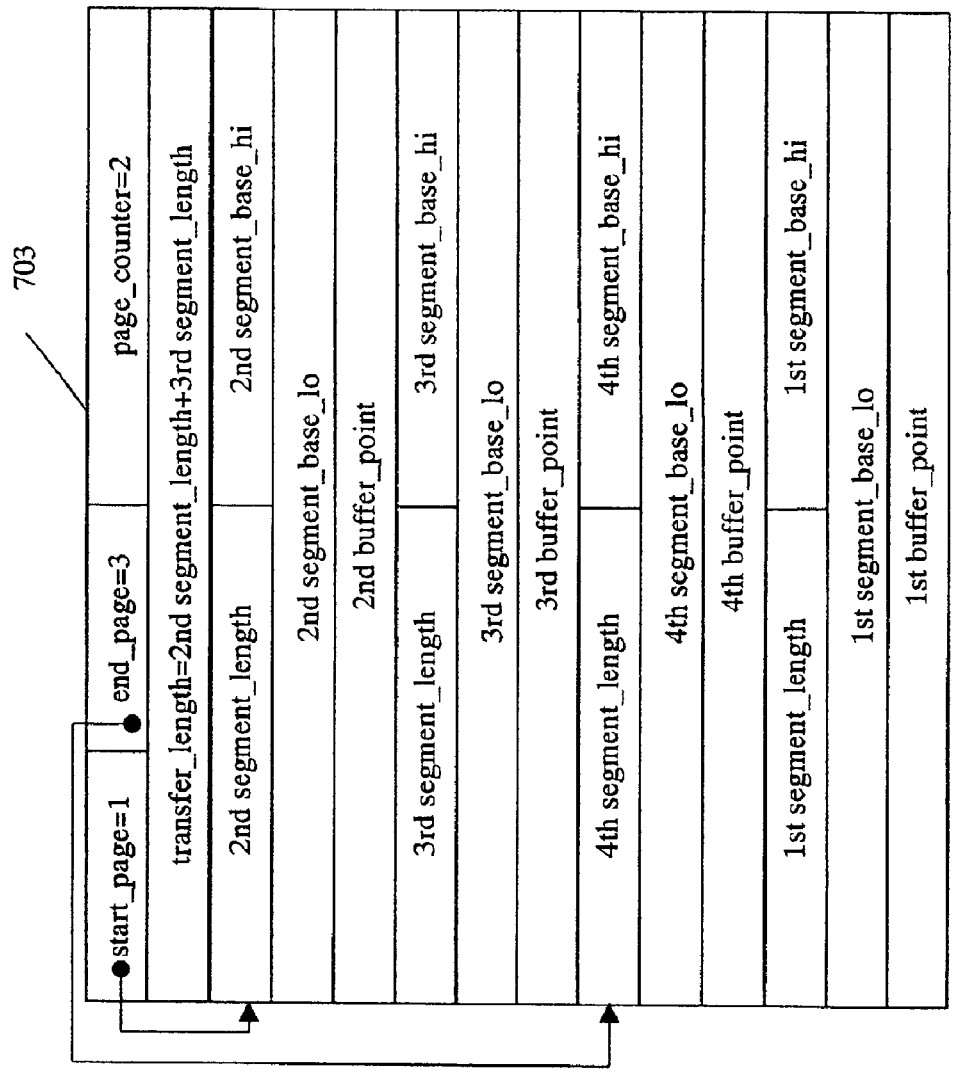
FIG. 24 is a diagram showing still another example of the state of batch transfer information table in Embodiment 3.

If Step S 2211 is performed, then Step S 2207 is repeated. The value of the page counter is reduced by 1 and becomes 2. Since the value of the page counter is not smaller than 1, Step S 2209 is performed. FIG. 24 shows the state of batch transfer information table 703 at that time. In Step S 2209, the pointer pointing to page element of fourth page 804 registered next to page element 803a on third page 803 in batch transfer information table 703 is set in the end_page field as shown in FIG. 24.

In the example of FIG. 20, third page 803 and fourth page 804 are not consecutive. In this case, data transfer control means 706 controls data transfer on the basis of transfer information. Thereby, transfer processing is executed (Step S 2212).

Figure 25:
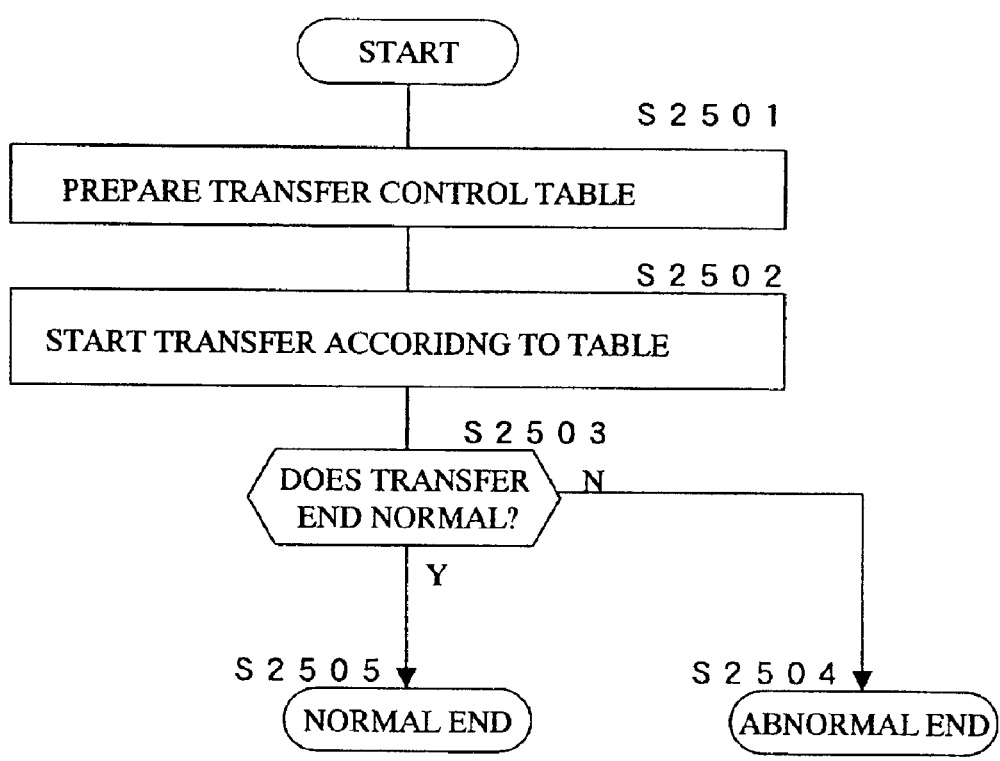
FIG. 25 is a flow chart showing transfer processing in detail in Embodiment 3.

FIG. 25 is a flow chart illustrating the transfer procedure in Embodiment 3.

Figure 26:
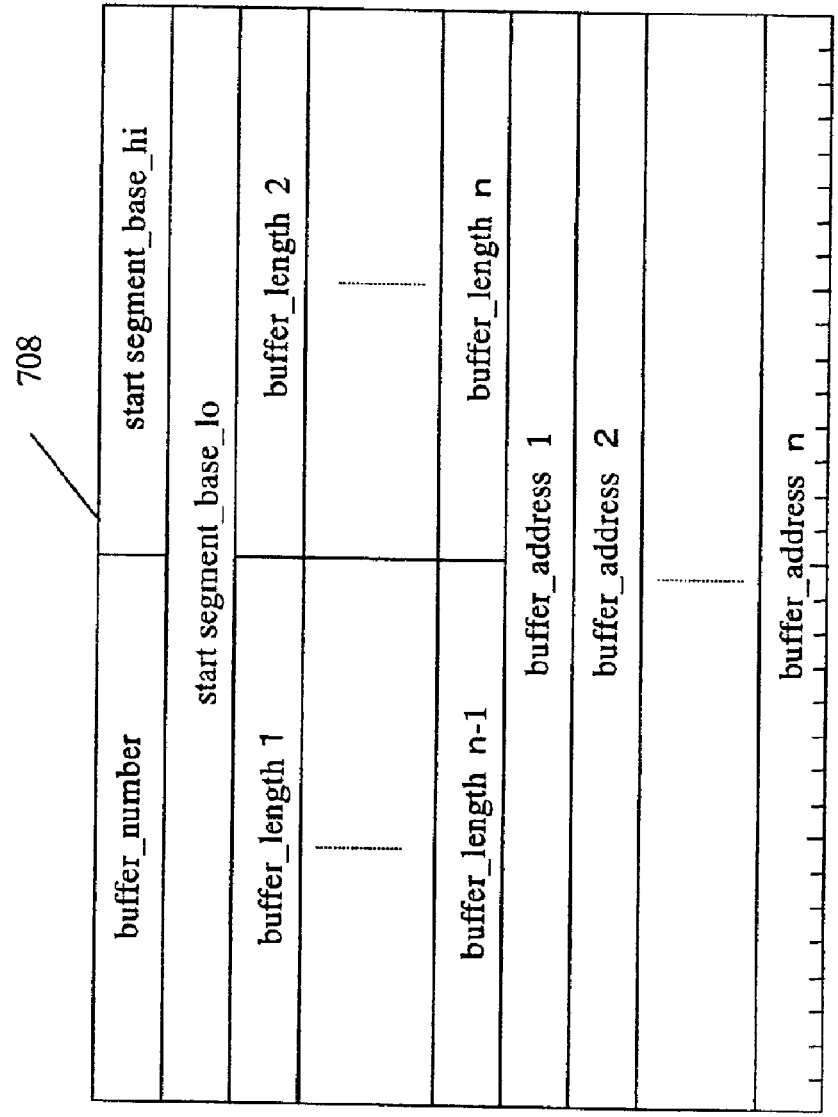
FIG. 26 is a diagram showing a configuration of the transfer control table in Embodiment 3.

First, a transfer control table 708 to be the respective parameters to start a communication controller is prepared (Step S 2501). FIG. 26 shows a configuration of the transfer control table.

As shown in FIG. 26, the transfer control table includes a buffer_number field. The number of buffers in which data is transferred is written in the buffer_number field. This value is set at a value obtained by subtracting the pointer of the starting page from the pointer of the continuation page, for example.

The address contained in page element the pointer of the starting page points to is set in the start_segment_base_hi field and the start_segment_base_lo field in the transfer control table.

As many buffer_length fields as the value of the buffer_ number fields are secured in the transfer control table. The page lengths contained in from page element the pointer of the starting page points to up to page element just before page element the pointer of the continuation page points to are set in respective buffer_length fields.

Also, as many buffer_address fields as the value of the buffer_number field are secured in the transfer control table. Addresses contained in from page element the pointer of the starting pointer points to up to page element just before the page element the pointer of the continuation page points to are set in respective buffer_address fields.

Figure 27:
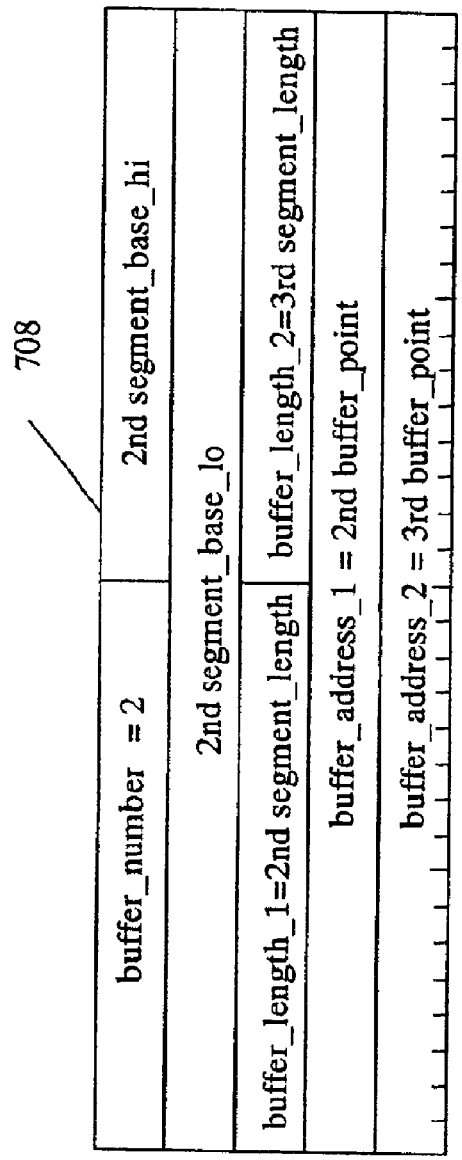
FIG. 27 is a diagram showing an example of the state of the transfer control table in Embodiment 3.

FIG. 27 shows the state of the transfer control table at that time.

As shown in FIG. 27, 2 is set in the buffer_number field. And the address of second page 802 is set in the start_ segment_base_hi field and the start_segment_base_lo field. Furthermore, two buffer_length fields and buffer_ address fields each are secured. And the page length of second page 802 and the page length of third page 803 are set in two buffer_length fields. The address of second page 802 and the address of third page 803 are set in two buffer_address fields.

If a transfer control table 708 is prepared, then the respective parameters for transfer control table 708 are set for the communication controller (Step S 2402). The communication controller controls operation timing of each section according to a built-in processing program and transfers data according to the parameters.

And it is judged whether an error occurred in data transfer (Step S 2203). If an error occurred in data transfer, the process ends with an error (Step S 2404). If no error occurred in data transfer, the process ends normal (Step S 2405).

If the data transfer is over, Step S 2213, Step S 2214 are performed.

In the two steps, transfer information setting means 702 renews batch transfer information table 703. In Step S 2213, the value of the transfer_length field of batch transfer information table 703 is renewed to the page length of page element the pointers of the continuation page points to. And in Step S 2214, the value of the start_page field is set at the value of the end_page field.

If batch transfer information table 703 is renewed, Step S 2207 is repeated. As a result, the value of the page counter becomes 1. Since the value of the page counter is not smaller than 1, Step S 2209 is performed. In Step S 2209, the pointer to specify page element of first page 801 registered next to page element 804a of fourth page 804 in batch transfer information table 703 is set in the value of the end_page field.

And in Step S 2210, it is judged whether fourth page 804 and first page 801 form a continuous area. In the example of FIG. 20, since a value obtained by adding the page length to the address of fourth page 804 agrees with the address of first page 801, it is judged that the two form the continuous area.

Because of the arrangement by arranging means 707, data are handled as if fourth page 804 is followed by first page 801, and therefore even if the address order is different from the order in the page table as in the case of fourth page 804 and first page 801, it is judged that the two are consecutive.

Figure 28:
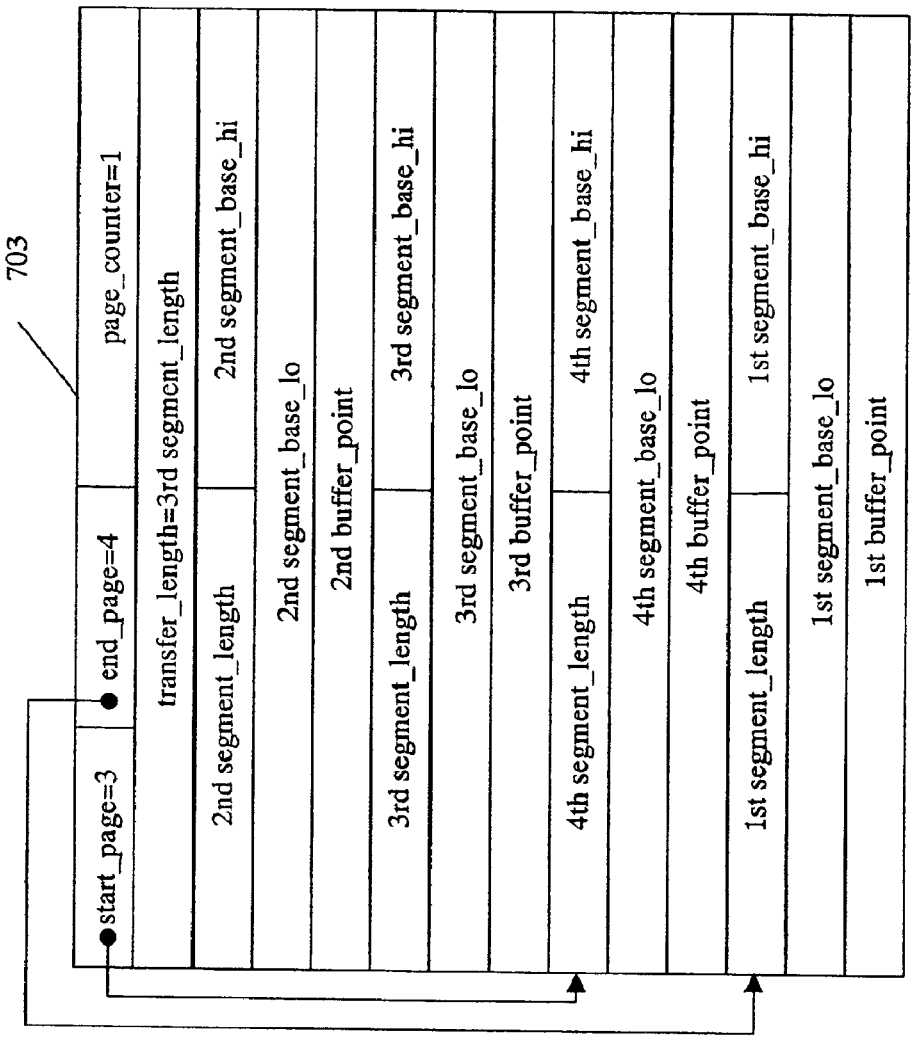
FIG. 28 is a diagram showing still another example of the state of the transfer control table in Embodiment 3.

If it is judged that fourth page 804 and first page 801 form the continuous area, Step S 2211 will be performed. FIG. 28 shows the state of batch transfer information table 703 at that time.

In Step S 2211, the page length contained in page element of first page 801 the pointer of the continuation page points to is added to the value of the transfer_length field as shown in FIG. 28.

If Step S 2211 is performed, then Step S 2207 is carried out. The value of the page counter is reduced by 1 and becomes 0. As a result, the value of the page counter is no longer not smaller than 1, not Step S 2209 but Step S 2215 is performed.

In Step S 2215 as in Step S 2212, transfer processing is executed. Thereby, data of fourth buffer 809 and first buffer 806 are transferred to fourth page 804 and first page 801 by the lump.

In this example, too, the total number of page is 4, but the number of transfer processings executed is 2.

If the transfer of data is controlled that way, the number of settings of address is further reduced, and the efficiency of data transfer processing improves.

Embodiment 4

In the data transfer devices in Embodiments 2 and 3, if instructions requesting data transfer are issued a plurality of times, the same procedure is repeated every time.

FIG. 29 shows an example of assignment of pages in the address space of the host PC for instructions requesting data transfer. In FIG. 29, the figures in the Host column indicate (start) addresses of pages. The numbers in 1st, 2nd, - - -, last columns indicate pages at which data are transferred on 1st, 2nd, - - -, last instructions. The pages are assigned to addresses having the numbers. The pages are all identical in page length.

In the example of FIG. 29, data are transferred to 16 pages on any instruction. According to Embodiment 3, transfer is started 8 times on any instruction.

In the example of FIG. 29, pages to which data is transferred on instructions except for the first instruction are assigned the same way. For example, it is often the case that even if plural instructions are issued as when file copying is effected, the address of page (and page length) will not change during that time.

In this case, it is not necessary to change the address of transfer destination and transfer data length set for each transfer on the preceding instruction.

Figure 30:
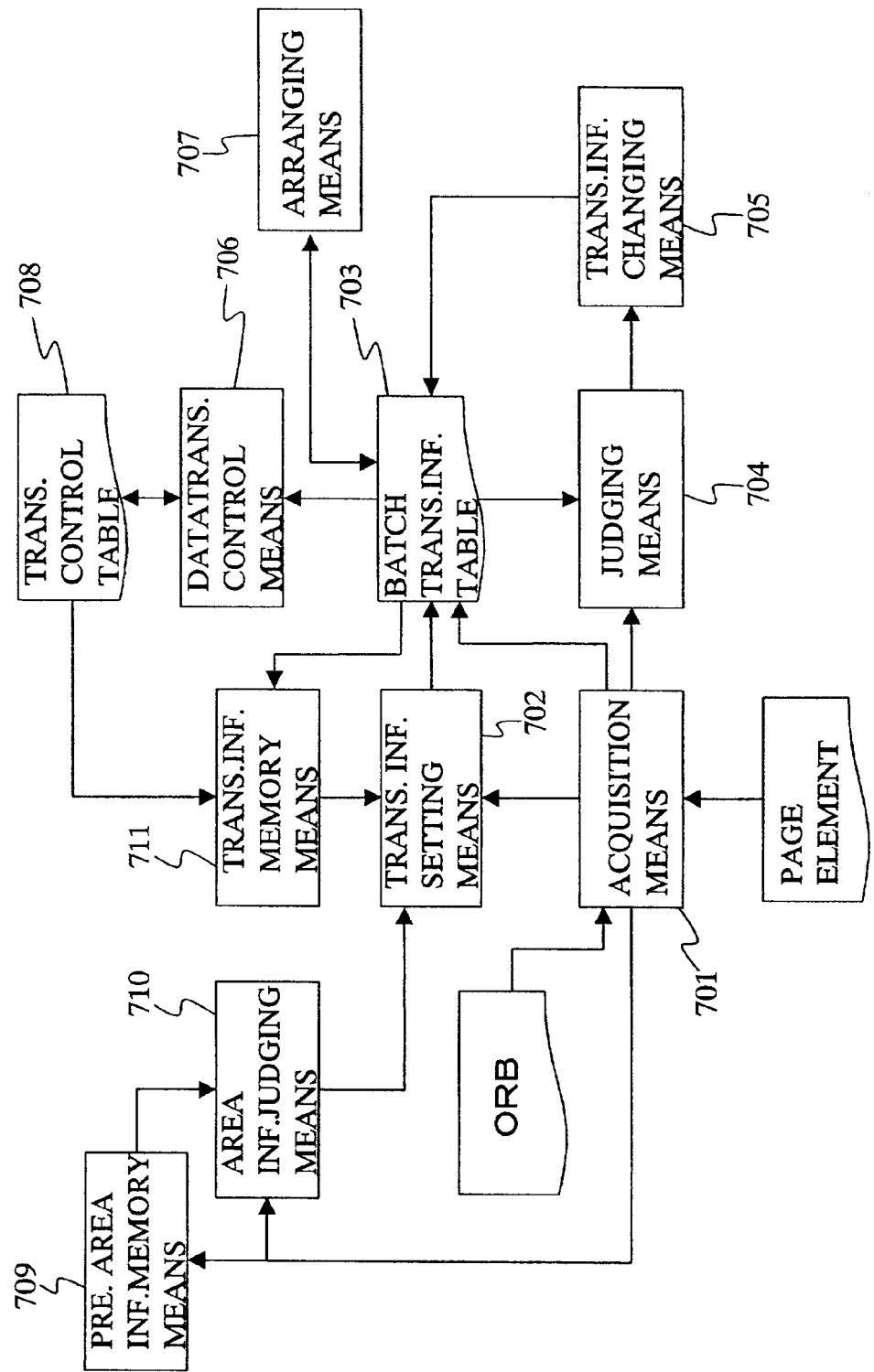
FIG. 30 is a schematic diagram showing a configuration of the data transfer device in Embodiment 4.

Therefore, the data transfer device in Embodiment 4 is provided with previous area information memory means 709, area information judging means 710 and transfer information memory means 711 in addition to the configuration of the data transfer device of Embodiment 3 as shown in FIG. 30.

Previous area information memory means 709 is to store a plurality of pieces of area information (plural page elements) acquired by the lump on the previous instruction requesting data transfer.

Area information judging means 710 judges whether page elements stored by previous area information memory means 709 agrees with page elements acquired by acquisition means 701 on the latest instruction requesting data transfer.

Transfer information memory means 711 stores transfer information used when transferring is effected on the previous instruction requesting data transfer.

Figure 31:
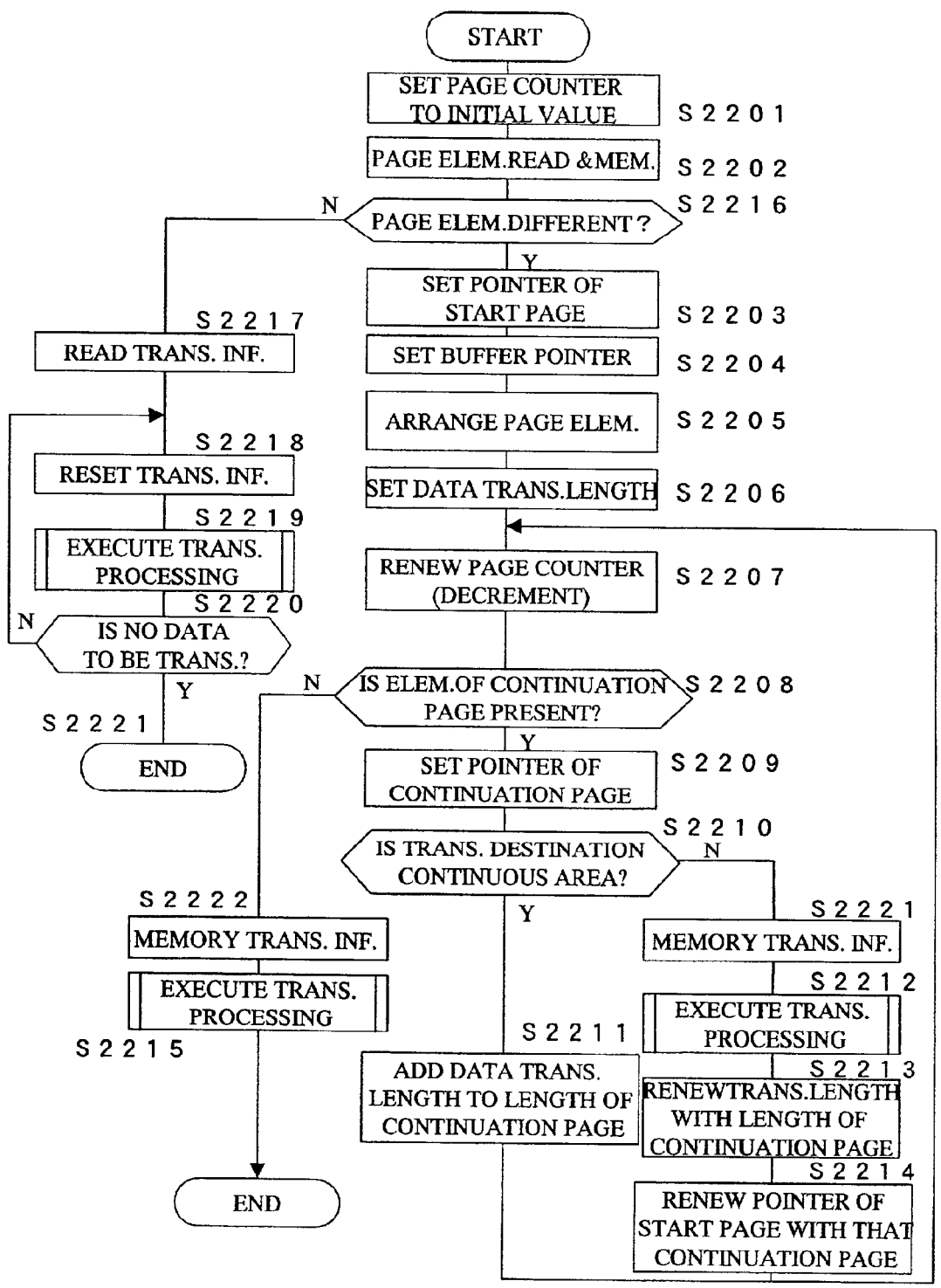
FIG. 31 is a flow chart showing data transfer method in Embodiment 4.

FIG. 31 is a flow chart showing a data transfer method using the data transfer device in Embodiment 4.

In this data transfer device, if the value of page_table_ present bit is 1, Step S 2201 is first performed as in Embodiment 3. Then, acquisition means 701 acquires page elements by the lump on the basis of the address of a page table specified by ORB (Step S 2202). Furthermore, page elements acquired by the lump are stored in previous area information memory means 709. Area information stored by previous area information memory means 709 then may be erased if the information is not used when the next instruction requesting data transfer is issued.

In the next step, it is judged by area information judging means 710 whether page elements stored by previous area information memory means 709 on the previous instruction requesting data transfer and page elements acquired by acquisition means 701 on the latest instruction requesting data transfer agree with each other (Step S 2216).

The procedure to follow when it is judged that the page elements differs is basically the same as in Embodiment 3. However, transfer information which is used in transfer processing in Step S 2212 or Step S 2215 is stored in transfer information memory means 711 (Step S 2221 or Step S 2222).

If it is judged that there is agreement in page elements, on the other hand, transfer information used on the previous instruction is read out from transfer information memory means 711 and is reset in batch transfer information table 703 by transfer information setting means 702 (Step S 2218). Transfer information in batch transfer information table 703 becomes the same as that for the previous instruction.

And in this state, transfer processing is executed in the same way as in Step S 2221 or Step S 2222 (Step S 2219).

If transfer processing is executed and if there is no data yet to be transferred, the processing by the data transfer device ends (Step S 2221). Whether there is data yet to be transferred may be judged using the total number of pages and the number of buffers where data are transferred, for example. If each time Step S 2221 is performed, the number of buffers where data are transferred is subtracted from the total number of pages, it can be judged whether there is data yet to be transferred by seeing whether the result of the subtraction is 0. If there is data yet to be transferred, Step S 2218 to Step S 2220 are repeated.

If transfer processing is executed that way, such steps as arranging of page element can be dropped, whereby the processing efficiency can be improved.

In Embodiment 4, some means are added to the configuration of the data transfer device of Embodiment 3. Likewise, the processing efficiency can be improved by adding some means to the configuration of the data transfer device of Embodiment 2.

In Embodiment 4, if all page elements are identical, Step S 2217 to Step S 2220 are repeated, but the present invention is not limited to that. Only the pages where it is judged that page element is identical may be subjected to the same transfer control as the previous control.

In the present embodiments, furthermore, the present invention is applied to data transfer control using SBP-2 standards, but the present invention is not limited to that.

The data transfer program used to materialize a data transfer device can be distributed via electric communication circuits such as the Internet and also can be distributed recorded on a computer readable storage medium such as CD-ROM.

In each embodiment, the present invention is applied to HDD601, but the present invention is not limited to that. The present invention is applied to optical disk drive, for example.

The instruction requesting data transfer is issued from PC, but the present invention is not limited to that. The instruction may be issued from other peripheral equipments having function for issuing the instruction (initiator function).

In Embodiment 2 and 3, the number of page elements evacuated to batch transfer information table 703 is 256, the number is limited to this value.

In Embodiment 1, 2 and 3, the pages are different each other in page length, but the pages may be all identical in page length.

As set forth above, according to the present invention, if plural areas where data is transferred are consecutive, transfer information such as transfer data length is changed according to the continuous area, and data transfer is controlled according to the transfer information. That makes it possible to transfer data corresponding to a plurality of areas by the lump, and reduces the number of address settings the more in transferring. Because of that, the data transferring efficiency improves.

Furthermore, if area information is acquired by the lump, the higher speed can be achieved in transfer control. In addition, if pieces of area information acquired by the lump are arranged according to the address order, the number of settings of addresses can be reduced. Furthermore, if area information used at the time when the previous instruction was issued agrees with area information used at the time when the latest instruction was issued and if transfer is controlled on the basis of transfer information used at the time when the previous instruction is issued, the procedure for changing transfer information can be reduced substantially and the processing efficiency improves.

What is claimed is:

1. A data transfer device which comprises:
    acquisition means for acquiring plural pieces of area information including an area address and area length on the basis of an address of an area table in which plural pieces of said area information are written, when an instruction requesting data transfer to specify the address of the area table as destination of requested data transfer is issued,
    transfer information setting means for setting transfer information including an address of transfer source, a transfer data length and an address of transfer destination of data on the basis of each pieces of said area information of areas as transfer destination areas,
    judging means for judging whether a transfer destination area and another transfer destination area form a continuous area where plural areas are consecutive,
    transfer information changing means for changing said transfer information according to said continuous area when it is judged by said judging means that said transfer destination area and another transfer destination area form said continuous area, and
    data transfer control means for controlling the transfer of data on the basis of said transfer information.

2. The data transfer device as defined in claim 1 wherein said transfer information changing means changes the transfer data length of said transfer information to a value obtained by adding the area length of said another transfer destination area to the transfer data length of said transfer information.

3. The data transfer device as defined in claim 1 wherein said acquisition means acquires plural pieces of said area information by the lump.

4. The data transfer device as defined in claim 3 which further comprises arranging means for arranging said pieces of area information acquired by said acquisition means according to increasing order of area address and wherein said judging means judges according to the order of arrangement by said arranging means whether said transfer destination area and another transfer destination area form said continuous area.

5. A data transfer device which comprises:
    acquisition means for acquiring plural pieces of area information including an area address and area length on the basis of an address of an area table in which plural pieces of said area information are written, when an instruction requesting data transfer to specify the address of the area table as destination of requested data transfer is issued, wherein said acquisition means acquires plural pieces of said area information by the lump,
    transfer information setting means for setting transfer information including an address of transfer source, a transfer data length and an address of transfer destination of data on the basis of each pieces of said area information of areas as transfer destination areas,
    judging means for judging whether a transfer destination area and another transfer destination area form a continuous area where plural areas are consecutive,
    transfer information changing means for changing said transfer information according to said continuous area when it is judged by said judging means that said transfer destination area and another transfer destination area form said continuous area,
    data transfer control means for controlling the transfer of data on the basis of said transfer information,
    previous area information memorizing means for memorizing said area information acquired on a previous instruction requesting the data transfer, and
    area information judging means for judging whether said previous area information memorized in the previous area information memorizing means agrees with said area information acquired by said acquisition means on said latest instruction requesting the data transfer,
    wherein in areas where said area information judging means judges that said previous area information agrees with said area information newly acquired, said data transfer control means controls the data transfer in the same way as for the previous transfer.

6. A data transfer method which comprises the steps of:
    acquiring plural pieces of area information including an area address and area length on the basis of an address of an area table in which plural pieces of said area information are written, when an instruction requesting data transfer to specify the address of the area table as destination of requested data transfer,
    setting transfer information including an address of transfer source, a transfer data length and an address of transfer destination of data on the basis of each pieces of said area information of areas as transfer destination areas, judging whether a transfer destination area and another transfer destination area form a continuous area where plural areas are consecutive, changing said transfer information according to said continuous area when it is judged by said judging means that said transfer destination area and another transfer destination area form said continuous area, and controlling the transfer of data on the basis of said transfer information.

7. A data transfer program to have a computer execute the steps of:

acquiring plural pieces of area information including an area address and area length on the basis of an address of an area table in which plural pieces of said area information are written, when an instruction requesting data transfer to specify the address of the area table as destination of requested data transfer, setting transfer information including an address of transfer source, a transfer data length and an address of transfer destination of data on the basis of each pieces of said area information of areas as transfer destination areas, judging whether a transfer destination area and another transfer destination area form a continuous area where plural areas are consecutive, changing said transfer information according to said continuous area when it is judged by said judging means that said transfer destination area and another transfer destination area form said continuous area, and controlling the transfer of data on the basis of said transfer information.

8. A computer readable storage medium storing a data transfer program to have a computer execute the steps of:

acquiring plural pieces of area information including an area address and area length on the basis of an address of an area table in which plural pieces of said area information are written, when an instruction requesting data transfer to specify the address of the area table as destination of requested data transfer, setting transfer information including an address of transfer source, a transfer data length and an address of transfer destination of data on the basis of each pieces of said area information of areas as transfer destination areas, judging whether a transfer destination area and another transfer destination area form a continuous area where plural areas are consecutive, changing said transfer information according to said continuous area when it is judged by said judging means that said transfer destination area and another transfer destination area form said continuous area, and controlling the transfer of data on the basis of said transfer information.

9. A data transfer device which comprises:

an acquisition unit configured to acquire plural pieces of area information which are written in an area table, on the basis of an address of the area table, when an instruction requesting data transfer to specify the address of the area table as destination of requested data transfer is issued, wherein the area information includes an area address and area length, a transfer information setting unit configured to set transfer information including an address of transfer source, a transfer data length and an address of transfer destination of data on the basis of each pieces of the area information of areas as transfer destination areas, a judging unit configured to judge whether a transfer destination area and another transfer destination area form a continuous area where plural areas are consecutive, a transfer information changing unit configured to change the transfer information according to the continuous area when it is judged by said judging means that said transfer destination area and another transfer destination area form the continuous area, and data transfer control unit configured to control the transfer of data on the basis of the set or changed transfer information.

* * * * *